(12) United States Patent
Mou et al.

(10) Patent No.: US 12,447,803 B2
(45) Date of Patent: Oct. 21, 2025

(54) METHOD OF PREVENTING AIR POLLUTION IN VEHICLE

(71) Applicant: Microjet Technology Co., Ltd., Hsinchu (TW)

(72) Inventors: Hao-Jan Mou, Hsinchu (TW); Ching-Sung Lin, Hsinchu (TW); Chin-Chuan Wu, Hsinchu (TW); Yung-Lung Han, Hsinchu (TW); Chi-Feng Huang, Hsinchu (TW); Chun-Yi Kuo, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 978 days.

(21) Appl. No.: 17/537,886

(22) Filed: Nov. 30, 2021

(65) Prior Publication Data
US 2022/0194182 A1    Jun. 23, 2022

(30) Foreign Application Priority Data
Dec. 21, 2020   (TW) ................................ 109145352

(51) Int. Cl.
*B60H 3/00*   (2006.01)
*B60H 1/00*   (2006.01)
(Continued)

(52) U.S. Cl.
CPC .......... *B60H 3/0092* (2013.01); *B60H 1/008* (2013.01); *B60H 3/0078* (2013.01);
(Continued)

(58) Field of Classification Search
CPC .. B60H 3/0092; B60H 3/0078; B60H 3/0658; B60H 1/008; B60H 2003/0675;
(Continued)

(56) References Cited

U.S. PATENT DOCUMENTS

| | | | |
|---|---|---|---|
| 5,624,639 A * | 4/1997 | Ariga ...................... | F24F 8/108 55/497 |
| 10,682,895 B2 | 6/2020 | Mathiasson et al. | |

(Continued)

FOREIGN PATENT DOCUMENTS

| | | | |
|---|---|---|---|
| CN | 204757277 U | * | 11/2015 |
| CN | 204870438 U | | 12/2015 |

(Continued)

*Primary Examiner* — Jennifer Dieterle
*Assistant Examiner* — Qianping He
(74) *Attorney, Agent, or Firm* — Birch, Stewart, Kolasch & Birch, LLP

(57) ABSTRACT

A method of preventing air pollution in a vehicle is disclosed. Firstly, an out-car gas detection device, an in-car gas detection device and a purification device are provided to detect the air pollution and transmit a respective gas detection datum to a connection device. An in-car gas exchange system is provided for intelligently selecting and controlling a gas outside the vehicle to be introduced or not introduced into the inner space of the vehicle. The connection device receives and compares the gas detection data, so that the connection device selectively transmits a control instruction to the in-car gas exchange system and the purification device, and the air pollution in the inner space of the vehicle is exchanged and filtered, so as to provide clean, safe and breathable air.

21 Claims, 31 Drawing Sheets

(51) Int. Cl.
 *B60H 3/06* (2006.01)
 *A61L 9/20* (2006.01)

(52) U.S. Cl.
 CPC ............ *B60H 3/0658* (2013.01); *A61L 9/205* (2013.01); *A61L 2209/16* (2013.01); *B60H 2003/0675* (2013.01); *B60H 2003/0683* (2013.01)

(58) Field of Classification Search
 CPC ........ B60H 2003/0683; B60H 1/00885; B60H 1/00271; B60H 1/00321; B60H 1/00899; B60H 1/00335; B60H 1/00485; B60H 1/00; B60H 1/00021; B60H 1/00921; B60H 1/00564; B60H 2001/2281; A61L 9/205; A61L 2209/16
 USPC .............................................................. 95/8
 See application file for complete search history.

(56) References Cited

U.S. PATENT DOCUMENTS

| | | | | |
|---|---|---|---|---|
| 2006/0035579 | A1* | 2/2006 | Choi | F24F 8/167 |
| | | | | 454/237 |
| 2013/0055890 | A1* | 3/2013 | Lim | B01D 46/46 |
| | | | | 180/65.21 |
| 2018/0290104 | A1* | 10/2018 | Jong | B01D 53/30 |
| 2019/0023223 | A1* | 1/2019 | Yoo | B60R 25/043 |
| 2020/0298659 | A1* | 9/2020 | Sakane | B60H 1/00 |
| 2020/0346511 | A1* | 11/2020 | Hasegawa | B60H 3/0085 |

FOREIGN PATENT DOCUMENTS

| | | | | |
|---|---|---|---|---|
| CN | 107618338 A | | 1/2018 | |
| CN | 207388813 U | | 5/2018 | |
| CN | 105966195 B | | 9/2018 | |
| CN | 208805443 U | * | 4/2019 | ......... G01N 15/0205 |
| CN | 110466307 A | | 11/2019 | |
| CN | 108248344 B | | 1/2020 | |
| CN | 111263703 A | | 6/2020 | |
| CN | 111391623 A | | 7/2020 | |
| CN | 111845243 A | | 10/2020 | |
| JP | 3-92423 A | | 4/1991 | |
| JP | 8-253025 A | | 10/1996 | |
| JP | 2000-135918 A | | 5/2000 | |
| JP | 2001-63345 A | | 3/2001 | |
| JP | 2005-297720 A | | 10/2005 | |
| KR | 10-2018-0028174 A | | 3/2018 | |
| TW | M278593 U | | 10/2005 | |
| TW | M324609 U | | 1/2008 | |
| TW | M508454 U | | 9/2015 | |
| TW | M517115 U | | 2/2016 | |
| WO | WO 2019/022042 A1 | | 1/2019 | |

* cited by examiner

METHOD OF PREVENTING AIR POLLUTION IN VEHICLE

FIELD OF THE INVENTION

The present disclosure relates to an air pollution exchange method executed in a vehicle, and more particularly to a method of preventing air pollution in a vehicle.

BACKGROUND OF THE INVENTION

With the rapid development of the global population and industry, the air quality is deteriorating gradually. It is not only harmful to human health but also life-threatening in severe cases for people to expose in the harmful air pollution gases for a long time.

There are many pollutants in the air, such as carbon dioxide, carbon monoxide, formaldehyde, bacteria, fungi, volatile organic compound (VOC), suspended particulates or ozone, etc. which may be seriously harmful to human body as the concentration of pollutants increases. In the case of suspended particles, such fine particles might pass through the alveoli and circulate throughout the body with the blood and is not only harmful to the respiratory tract, but also might cause cardiovascular disease or increases the risk of cancer.

Nowadays, the prevalence of epidemic diseases, such as influenza and pneumonia, not only threatens people's health, but also restricts people's social activities, and the willingness to take public transportation has also decreased. As a result, driving by themselves has become the first choice of transportation when people need to go out. Therefore, how to make sure that the gas in the vehicle is clean and safe for people to breath at all times during driving by people becomes an important research and development topic of the present disclosure.

SUMMARY OF THE INVENTION

An object of the present disclosure is to provide a method of preventing air pollution in a vehicle. An out-car gas detection datum, an in-car gas detection datum and an inside-device gas detection datum are detected and outputted by gas detection modules provided in the out-car gas detection device, the in-car gas detection device and the purification device, respectively. An in-car gas exchange system is provided for intelligently selecting and controlling the introduction of a gas outside the vehicle into the inner space of the vehicle. A connection device is provided to receive and compare the out-car gas detection datum, the in-car gas detection datum and the inside-device gas detection datum under the calculation of artificial intelligence, thereby the connection device selectively transmits a control instruction to the in-car gas exchange system and the at least one purification device to enable operation and control the operation time thereof, so that the gas outside the vehicle is controlled to be introduced or not introduced into the inner space of the vehicle, and the air pollution in the inner space of the vehicle is exchanged out of the vehicle. At the same time, the purification device is controlled and enabled to filter the air pollution in the inner space of the vehicle, whereby the in-car gas detection datum detected for the air pollution in the inner space of the vehicle is reduced to a safe detection value, and clean, safe and breathable air is provided.

In accordance with an aspect of the present disclosure, a method of preventing air pollution in a vehicle is provided and includes: a) providing an out-car gas detection device to detect the air pollution outside the vehicle and transmit an out-car gas detection datum; b) providing an in-car gas detection device to detect the air pollution inside the vehicle and transmit an in-car gas detection datum; c) providing an in-car gas exchange system for intelligently selecting and controlling the introduction of a gas outside the vehicle into the inner space of the vehicle; d) providing at least one purification device to detect and transmit an inside-device gas detection datum for intelligently selecting and controlling the activation of filtering the air pollution in the inner space of the vehicle; and e) providing a connection device to receive and compare the out-car gas detection datum, the in-car gas detection datum and the inside-device gas detection datum, so that the connection device selectively transmits a control instruction to the in-car gas exchange system and the at least one purification device, and the air pollution in the inner space of the vehicle is exchanged and filtered, so as to provide clean, safe and breathable air.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Please refer to FIGS. 1 to 14. The present disclosure provides a method of preventing air pollution, wherein exchanging and filtering are executed for air pollution in an inner space of the vehicle. The method is described in detail as follows.

Figure 1:
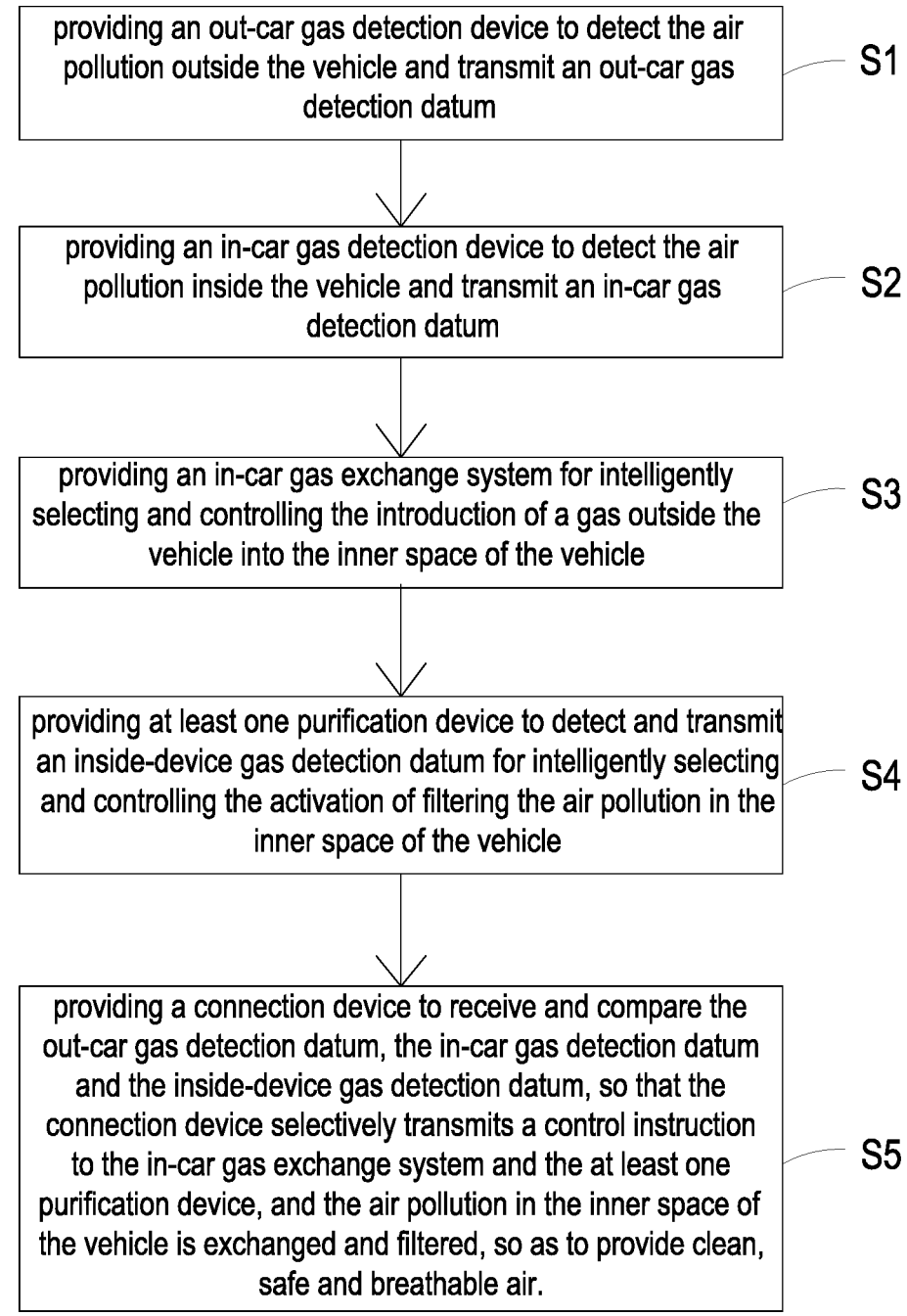
FIG. 1 is a flow chart illustrating a method of preventing air pollution in a vehicle according to an embodiment of the present disclosure.
Figure 2A:
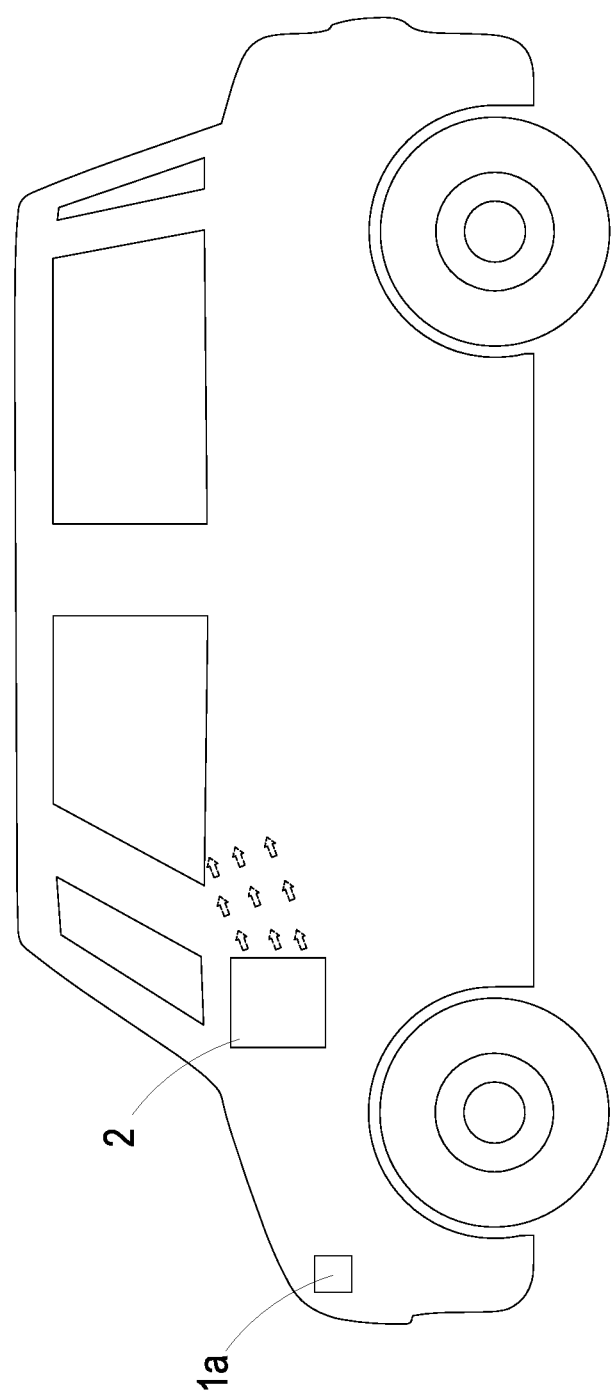
FIG. 2A is a first exemplary schematic diagram illustrating the method of preventing air pollution in the vehicle according to the embodiment of the present disclosure.
Figure 2B:
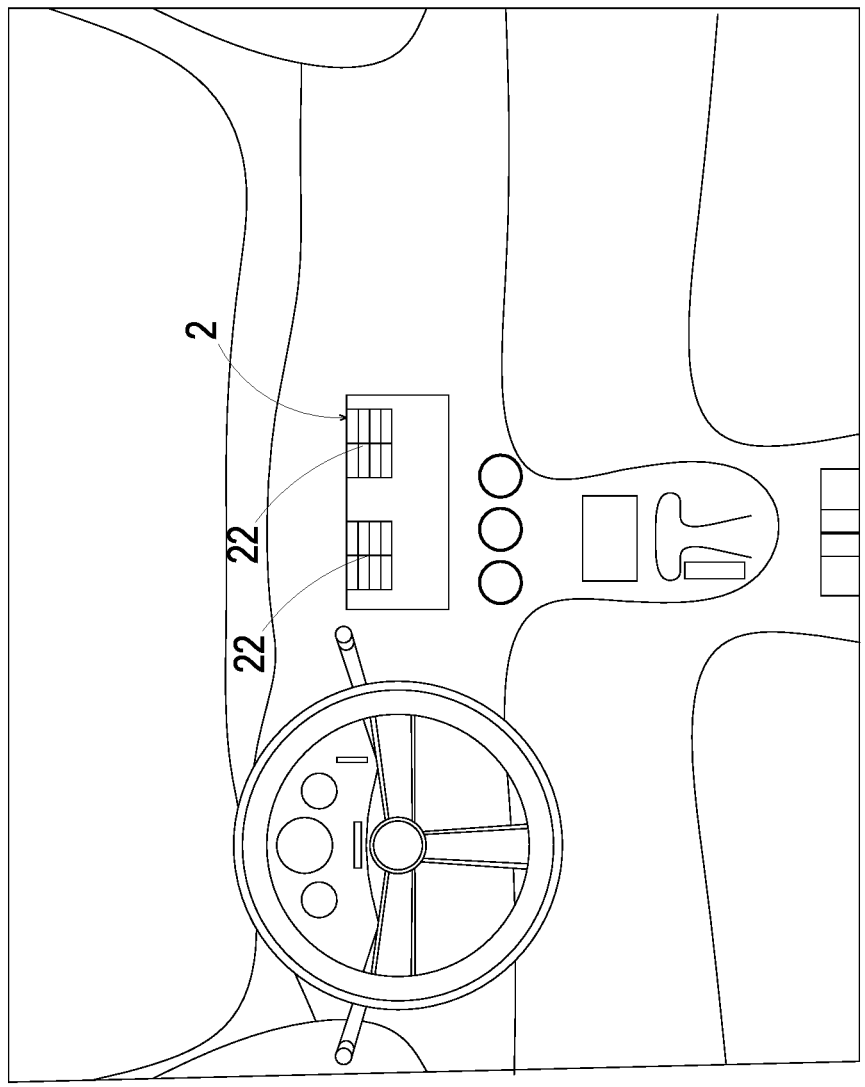
FIG. 2B is a second exemplary schematic diagram illustrating the method of preventing air pollution in the vehicle according to the embodiment of the present disclosure.
Figure 2C:
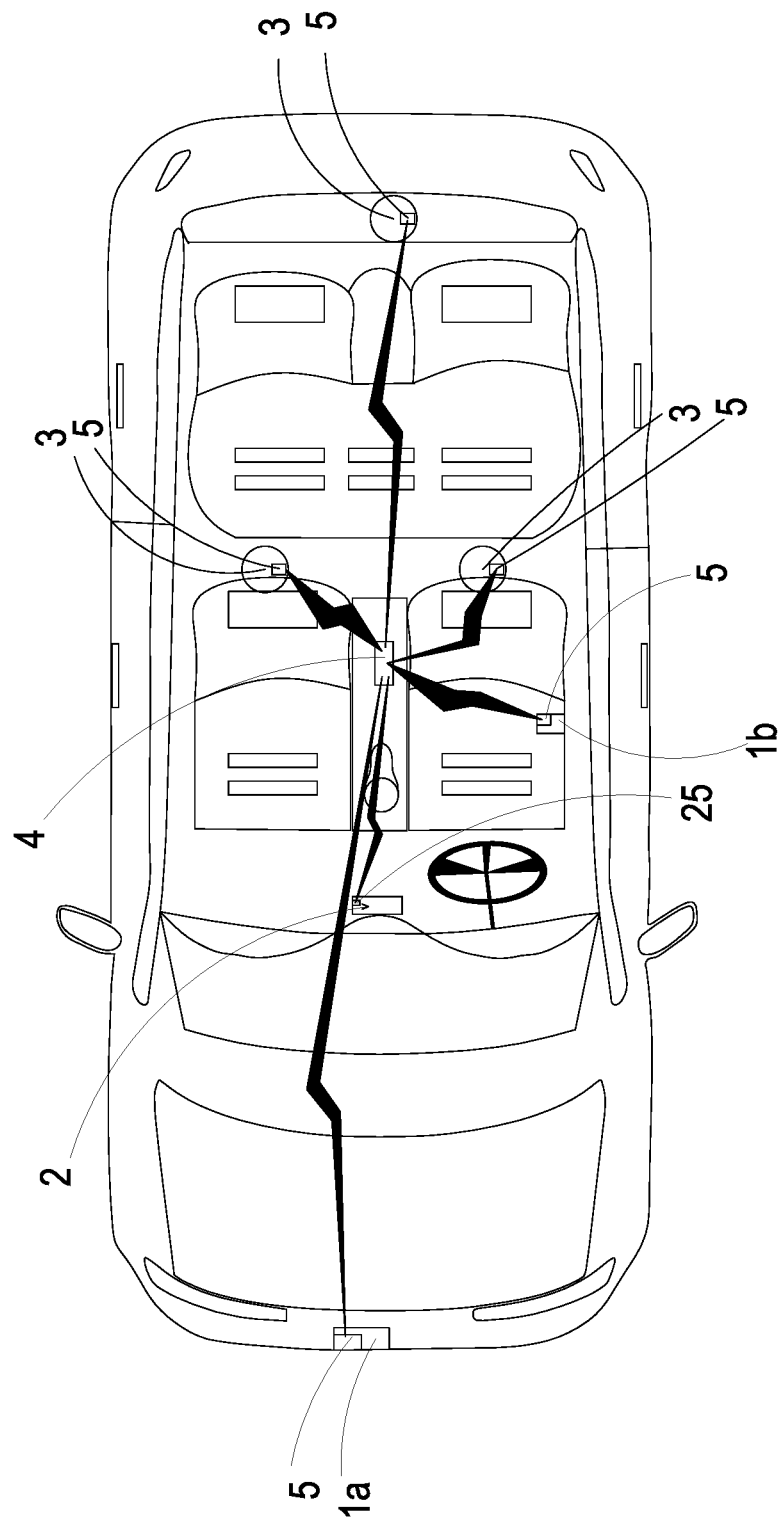
FIG. 2C is a third exemplary schematic diagram illustrating the method of preventing air pollution in the vehicle according to the embodiment of the present disclosure.

Firstly, in a step S1 of the method, an out-car gas detection device 1a is provided to detect the air pollution outside the vehicle and transmit an out-car gas detection datum. As shown in FIGS. 2A and 2C, the out-car gas detection device 1a is disposed outside a vehicle, and includes a gas detection module 5 for detecting the air pollution outside the vehicle and transmitting the out-car gas detection datum.

In a step S2 of the method, an in-car gas detection device 1b is provided to detect the air pollution inside the vehicle and transmit an in-car gas detection datum. As shown in FIG. 2C, the in-car gas detection device 1b is disposed inside the vehicle and includes a gas detection module 5 for detecting the air pollution inside the vehicle and transmitting the in-car gas detection datum. Preferably but not exclusively, in an embodiment, the in-car gas detection device 1b is a mobile detection device. That is, the in-car gas detection device 1b is a wearable device, such as a watch or a bracelet, which is directly worn on the human body (not shown). When people are in the inner space of the vehicle, the in-car gas detection device 1b detects the air pollution in the inner space of the vehicle immediately in real-time at any time and transmits the in-car gas detection datum.

Figure 3A:
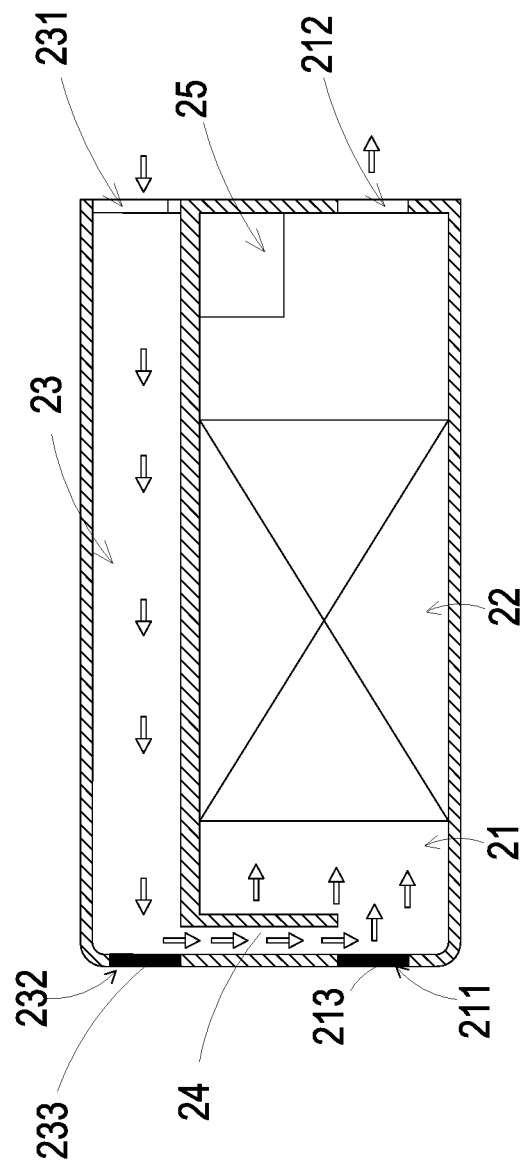
FIG. 3A is a first exemplary schematic diagram illustrating the in-car gas exchange system of the present disclosure.
Figure 3B:
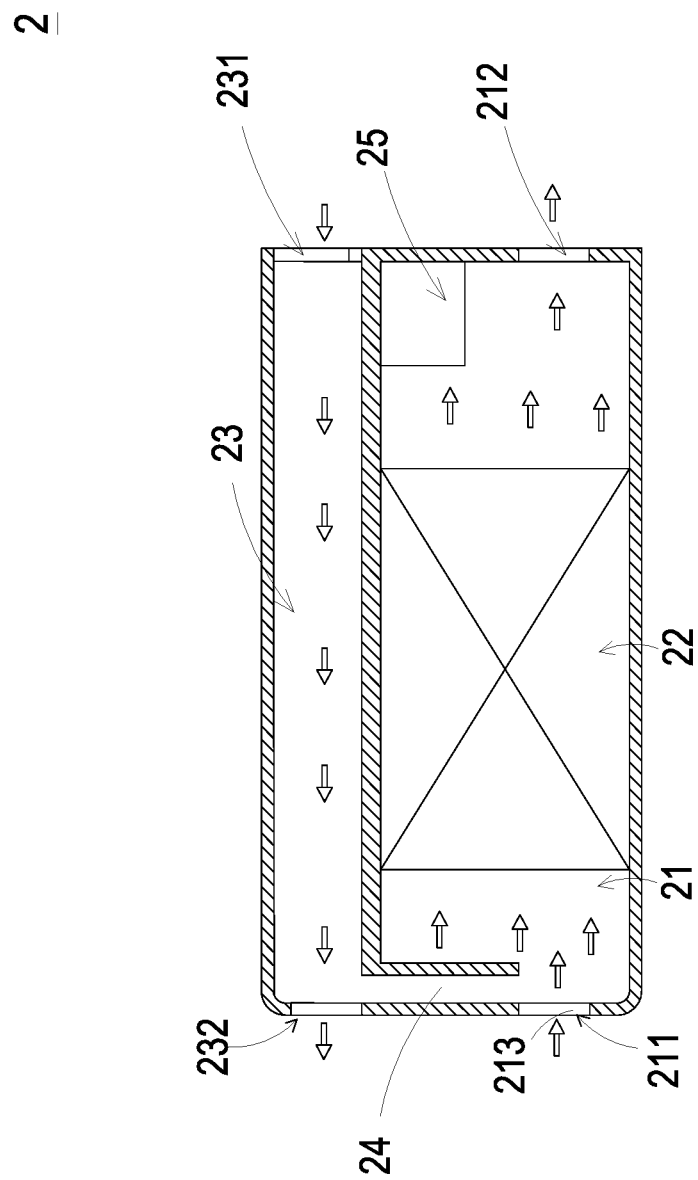
FIG. 3B is a second exemplary schematic diagram illustrating the in-car gas exchange system of the present disclosure.
Figure 3C:
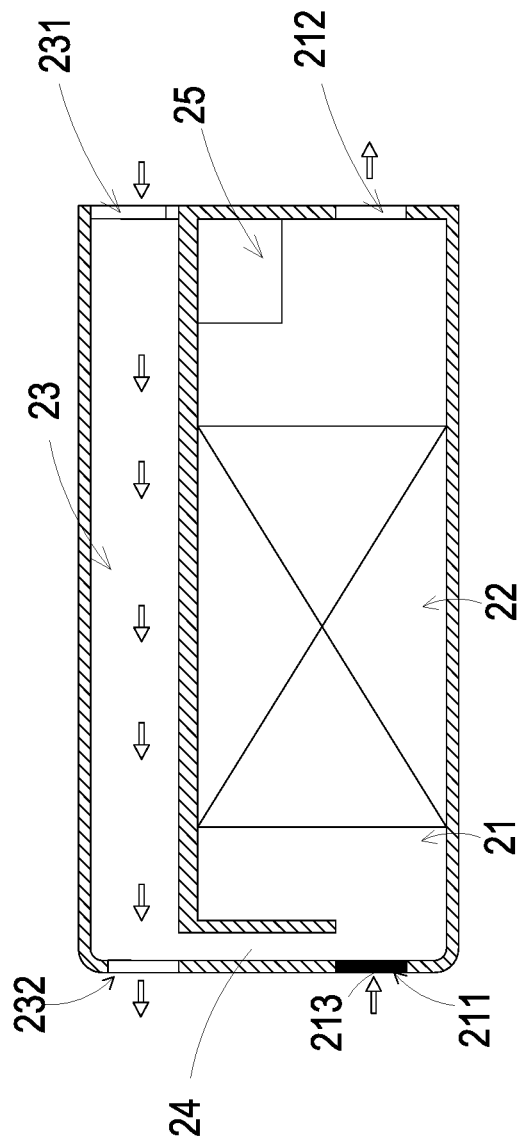
FIG. 3C is a third exemplary schematic diagram illustrating the in-car gas exchange system of the present disclosure.

In a step S3 of the method, an in-car gas exchange system 2 is provided for intelligently selecting and controlling a gas outside the vehicle to be introduced or not introduced into the inner space of the vehicle. As shown in FIGS. 2A to 2C and 3A, the in-car gas exchange system 2 is provided and executed in the inner space of the vehicle, and includes an air intake channel 21, an air conditioning unit 22, a gas exchange channel 23, a manifold channel 24 and a control drive unit 25. In the embodiment, the air intake channel 21 has an air inlet 211 and at least one air outlet 212, and an inlet valve 213 is disposed in the air inlet 211 for controlling the opening or closing of the air inlet 211. In the embodiment, the air exchange channel 23 has a gas exchange inlet 231 and a gas exchange outlet 232, and an outlet valve 233 is disposed in the gas exchange outlet 232 for controlling the opening or closing of the gas exchange outlet 232. In the embodiment, the manifold channel 24 is in fluid communication between air intake channel 21 and the gas exchange channel 23. As shown in FIG. 3A, the air conditioning unit 22 is disposed in the air intake channel 21, and the air in the inner space of the vehicle is transported into the gas exchange channel 23 through the gas exchange inlet 231 with the gas exchange outlet 232 controlled to be closed by the outlet valve 233, and then the gas entering the air intake channel 21 through the manifold channel 24 is introduced into the inner space of the vehicle through the air outlet 212, thereby a circulating air flow path is formed to adjust air temperature and humidity in the inner space of the vehicle. In the embodiment, the control drive unit 25 receives external information through a wireless communication transmission, so that the opening or closing of the inlet valve 213 and the outlet valve 233 is selectively controlled by the control drive unit 25, so as to control the introduction of a gas outside the vehicle into the inner space of the vehicle. As shown in FIG. 3B, the inlet valve 213 and the outlet valve 233 are intelligently selected to be opened by the control drive unit 25, the gas outside the vehicle is inhaled to the air intake channel 21 through the air inlet 211, and introduced into the inner space of the vehicle through the air outlet 212, and the air pollution in the inner space of the vehicle is introduced to the gas exchange channel 23 through the gas exchange inlet 231, and discharged out of the inner space of the vehicle through the gas exchange outlet 232. In that, the air pollution in the inner space of the vehicle is exchanged out of the vehicle. As shown in FIG. 3C, the inlet valve 213 and the outlet valve 233 are intelligently selected to be closed and opened by the control drive unit 25, respectively, so that the gas outside the vehicle is not introduced into the inner space of the vehicle, and the air pollution in the inner space of the vehicle is introduced to the gas exchange channel 23 through the gas exchange inlet 231, and discharged out of the inner space of the vehicle through the gas exchange outlet 232. In that, the air pollution in the inner space of the vehicle is exchanged out of the vehicle.

In a step S4 of the method, at least one purification device 3 is provided to detect and transmit an inside-device gas detection datum for intelligently selecting and controlling the activation of filtering the air pollution in the inner space of the vehicle. As shown in FIGS. 4A to 4E, the purification device 3 includes a main body 31, a purification unit 32 and a gas guider 33. The main body 31 includes at least one inlet 311 and at least one outlet 312, and a gas flow channel 313 is formed between the at least one inlet 311 and the at least one outlet 312. The purification unit 32 is disposed in the main body 31 for filtering the air pollution introduced into the main body 31 through the at least one inlet 311. The gas guider 33 is disposed in the gas flow channel 313 and adjacent to the at least one outlet 312, so as to control the air pollution outside the main body 31 to be inhaled and to flow through the purification unit 32 for filtering and purifying, so that a purified gas is formed by filtering the air pollution and discharged out through the at least one outlet 312. In the embodiment, the purification device 3 further includes a gas detection module 5 disposed in the gas flow channel 313 for detecting the air pollution in the gas flow channel 313 and transmitting the inside-device gas detection datum, and the gas detection module 5 controls the actuation of the gas guider 33.

Figure 13:
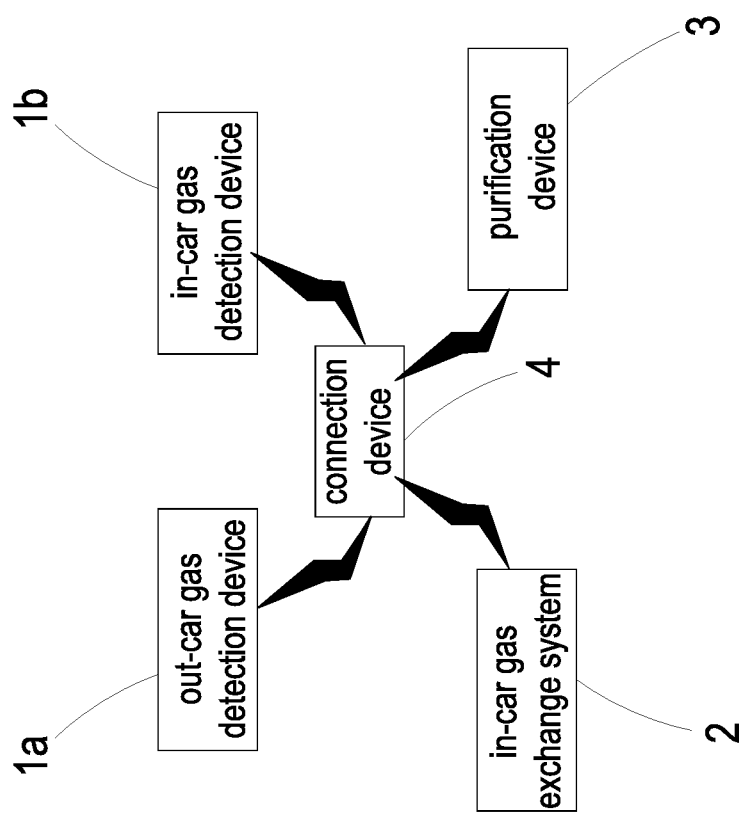
FIG. 13 is a schematic diagram illustrating a connecting configuration of the out-car gas detection device, the in-car gas detection device, the purification device and the connection device according to the embodiment of the present disclosure.

In a step S5 of the method, a connection device 4 is provided to receive and compare the out-car gas detection datum, the in-car gas detection datum and the inside-device gas detection datum, so that the connection device selectively transmits a control instruction to the in-car gas exchange system 2 and the at least one purification device 3, and the air pollution in the inner space of the vehicle is exchanged and filtered into a clean, safe and breathable condition. As shown in FIG. 2C, the connection device 4 receives and compares the out-car gas detection datum, the in-car gas detection datum and the inside-device gas detection datum under the calculation of artificial intelligence, thereby the connection device 4 selectively transmits a control instruction to the in-car gas exchange system 2 and the at least one purification device 3. The gas outside the vehicle is controlled by the in-car gas exchange system 2 to be introduced or not introduced into the inner space of the vehicle, and the air pollution in the inner space of the vehicle is exchanged out of the vehicle. At the same time, the purification device 3 is controlled and enabled to filter the air pollution in the inner space of the vehicle, so that the air pollution in the inner space of the vehicle is exchanged and filtered into a clean, safe and breathable condition. As shown in FIGS. 2C and 13, the connection device 4 is a mobile device, which receives the out-car gas detection datum, the in-car gas detection datum, and the inside-device gas detection datum through a wireless communication transmission for comparing under the calculation of artificial intelligence, and then transmits a control instruction to the in-car gas exchange system 2 and the least one purification device 3. Preferably but not exclusively, the connection device 4 is a mobile device, which receives and compares the out-car gas detection datum, the in-car gas detection datum, and the inside-device gas detection datum through a wireless communication transmission, and then transmits them to a cloud processing device (not shown) under the calculation of artificial intelligence. The cloud processing device intelligently selects and transmits a control instruction to the connection device 4, and then the connection device 4 transmits the control instruction to the in-car gas exchange system 2 and the at least one purification device 3.

According to the descriptions of the above method, the present disclosure provides a method of preventing air pollution in a vehicle. Through comparing the out-car gas detection datum, the in-car gas detection datum and the inside-device gas detection datum under the calculation of artificial intelligence, the connection device 4 selectively transmits a control instruction to the in-car gas exchange system 2 and the at least one purification device 3. In that, the gas outside the vehicle is controlled to be introduced or not introduced into the inner space of the vehicle by the in-car gas exchange system 2, and the air pollution in the inner space of the vehicle is exchanged out of the vehicle. At the same time, the purification device 3 is controlled and enabled to filter the air pollution in the inner space of the vehicle, and the air pollution in the inner space of the vehicle is exchanged and filtered so as to provide clean, safe and breathable air. Regarding to how the connection device 4 intelligently selects to transmit a control instruction is described in detail as follows.

As shown in FIG. 2C, FIG. 3B and FIG. 13, the out-car gas detection datum, the in-car gas detection datum and the inside-device gas detection datum are received and compared under the calculation of artificial intelligence by the connection device 4. When the connection device 4 indicates that the air pollution of the out-car gas detection datum is lower than the in-car gas detection datum, the control instruction transmitted by the connection device 4 is received by the control drive unit 25 of the in-car gas exchange system 2 at the same time, so that the inlet valve 213 and the outlet valve 233 are intelligently selected to be opened by the control drive unit 25, the gas outside the vehicle is inhaled to the air intake channel 21 through the air inlet 211, and introduced into the inner space of the vehicle through the air outlet 212, and the air pollution in the inner space of the vehicle is introduced to the gas exchange channel 23 through the gas exchange inlet 231, and discharged out of the inner space of the vehicle through the gas exchange outlet 232. In that, the air pollution in the inner space of the vehicle is exchanged out of the vehicle, and the in-car gas detection datum detected for the air pollution in the inner space of the vehicle is reduced to a safe detection value.

As shown in FIG. 2C, FIG. 3C and FIG. 13, the out-car gas detection datum, the in-car gas detection datum and the inside-device gas detection datum are received and compared under the calculation of artificial intelligence by the connection device 4. When the connection device 4 indicates that the air pollution of the in-car gas detection datum is lower than the out-car gas detection datum, the control instruction is transmitted by the connection device 4 and received by the control drive unit 25 of the in-car gas exchange system 2 at the same time, so that the inlet valve 213 and the outlet valve 233 are intelligently selected to be closed and opened by the control drive unit 25, respectively, the gas outside the vehicle is not introduced into the inner space of the vehicle, and the air pollution in the inner space of the vehicle is introduced to the gas exchange channel 23 through the gas exchange inlet 231, and discharged out of the inner space of the vehicle through the gas exchange outlet 232. In that, the air pollution in the inner space of the vehicle is exchanged out of the vehicle, and the in-car gas detection datum detected for the air pollution in the inner space of the vehicle is reduced to a safe detection value.

As shown in FIG. 2C, FIG. 3C and FIG. 13, the out-car gas detection datum, the in-car gas detection datum and the inside-device gas detection datum are received and compared under the calculation of artificial intelligence by the connection device 4. When the connection device 4 indicates that the air pollution of the in-car gas detection datum is lower than the out-car gas detection datum, the control instruction is transmitted by the connection device 4 and received by the control drive unit 25 of the in-car gas exchange system 2 at the same time, so that the inlet valve 213 and the outlet valve 233 are intelligently selected to be closed and opened by the control drive unit 25, respectively, the gas outside the vehicle is not introduced into the inner space of the vehicle. Furthermore, the control instruction is intelligently selected to be transmitted by the connection device 4 to control and actuate the at least one purification device 3 at the same time, so as to filter and purify the air pollution in the inner space of the vehicle. In that, the in-car gas detection datum detected for the air pollution in the inner space of the vehicle is reduced to a safe detection value.

As shown in FIG. 2C and FIG. 13, the out-car gas detection datum, the in-car gas detection datum and the inside-device gas detection datum are received and compared under the calculation of artificial intelligence by the connection device 4. When the in-car gas detection datum compared by the connection device 4 is greater than a safe detection value, the control instruction is transmitted by the connection device 4 to the at least one purification device 3, and the at least one purification device 3 is controlled and enabled, so as to filter and purify the air pollution in the inner space of the vehicle. In that, the in-car gas detection datum detected for the air pollution in the inner space of the vehicle is reduced to the safe detection value.

In the embodiment, the out-car gas detection datum, the in-car gas detection datum and the inside-device gas detection datum are detecting data of the air pollution. Preferably but not exclusively, the air pollution is one selected from the group consisting of suspended particles ($PM_1$, $PM_{2.5}$, $PM_{10}$), carbon monoxide (CO), carbon dioxide ($CO_2$), sulfur dioxide ($SO_2$), nitrogen dioxide ($NO_2$), lead (Pb), ozone ($O_3$), total volatile organic compounds (TVOC), formaldehyde (HCHO), bacteria, virus and a combination thereof. Preferably but not exclusively, the safe detection value includes one selected from the group consisting of suspended particles 2.5 concentration ($PM_{2.5}$) of less than 10 μg/m$^3$, carbon dioxide content ($CO_2$) of less than 1000 ppm, total volatile organic compounds (TVOC) of less than 0.56 ppm, formaldehyde (HCHO) content of less than 0.08 ppm, the amount of bacteria of less than 1500 CFU/m$^3$, the amount of fungi of less than 1000 CFU/m$^3$, sulfur dioxide ($SO_2$) content of less than 0.075 ppm, nitrogen dioxide ($NO_2$) content of less than 0.1 ppm, carbon monoxide (CO) content of less than 35 ppm, ozone ($O_3$) content of less than 0.12 ppm, lead (Pb) content of less than 0.15 μg/m$^3$ and a combination thereof.

After understanding the method of preventing air pollution in the vehicle according to the present disclosure, the executing device for the present disclosure is described in detail as follows.

Figure 5:
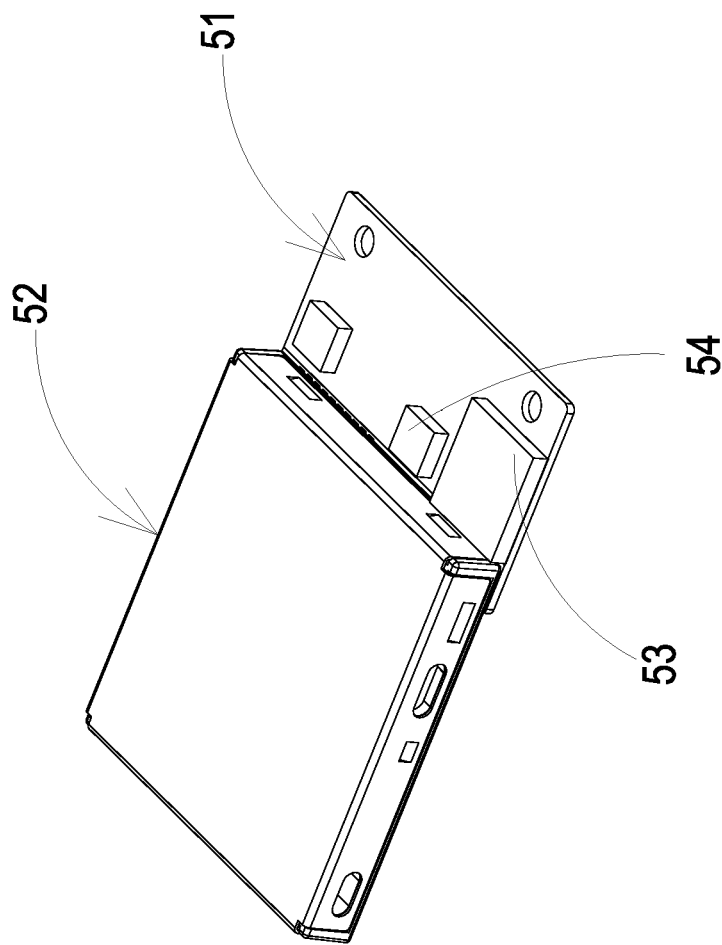
FIG. 5 is a schematic perspective view illustrating the gas detection module according to the embodiment of the present disclosure.
Figure 6A:
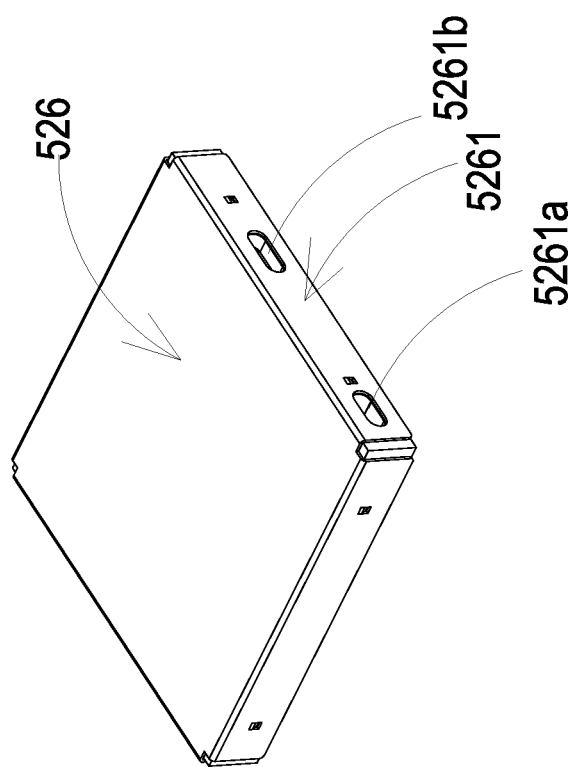
FIG. 6A is a schematic front perspective view illustrating the gas detection main part according to the embodiment of the present disclosure.
Figure 6B:
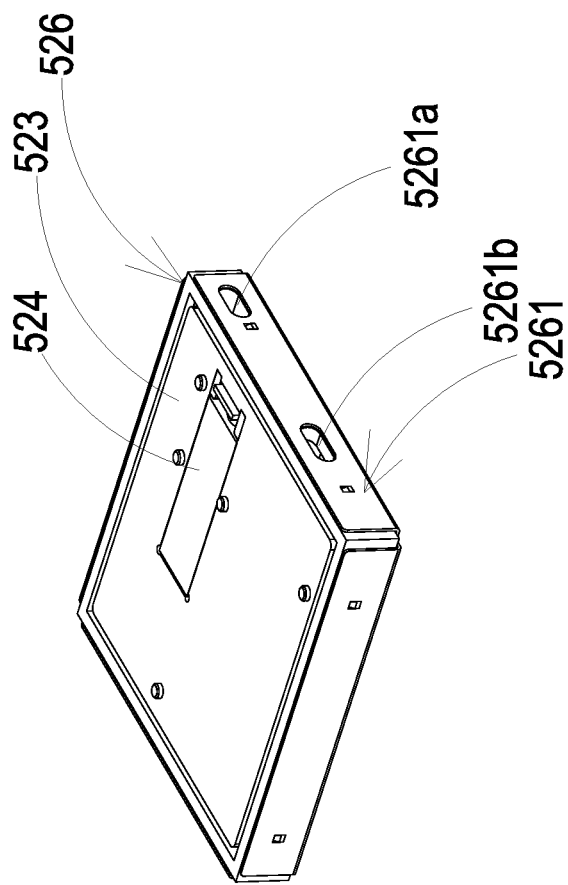
FIG. 6B is a schematic rear perspective view illustrating the gas detection main part according to the embodiment of the present disclosure.
Figure 6C:
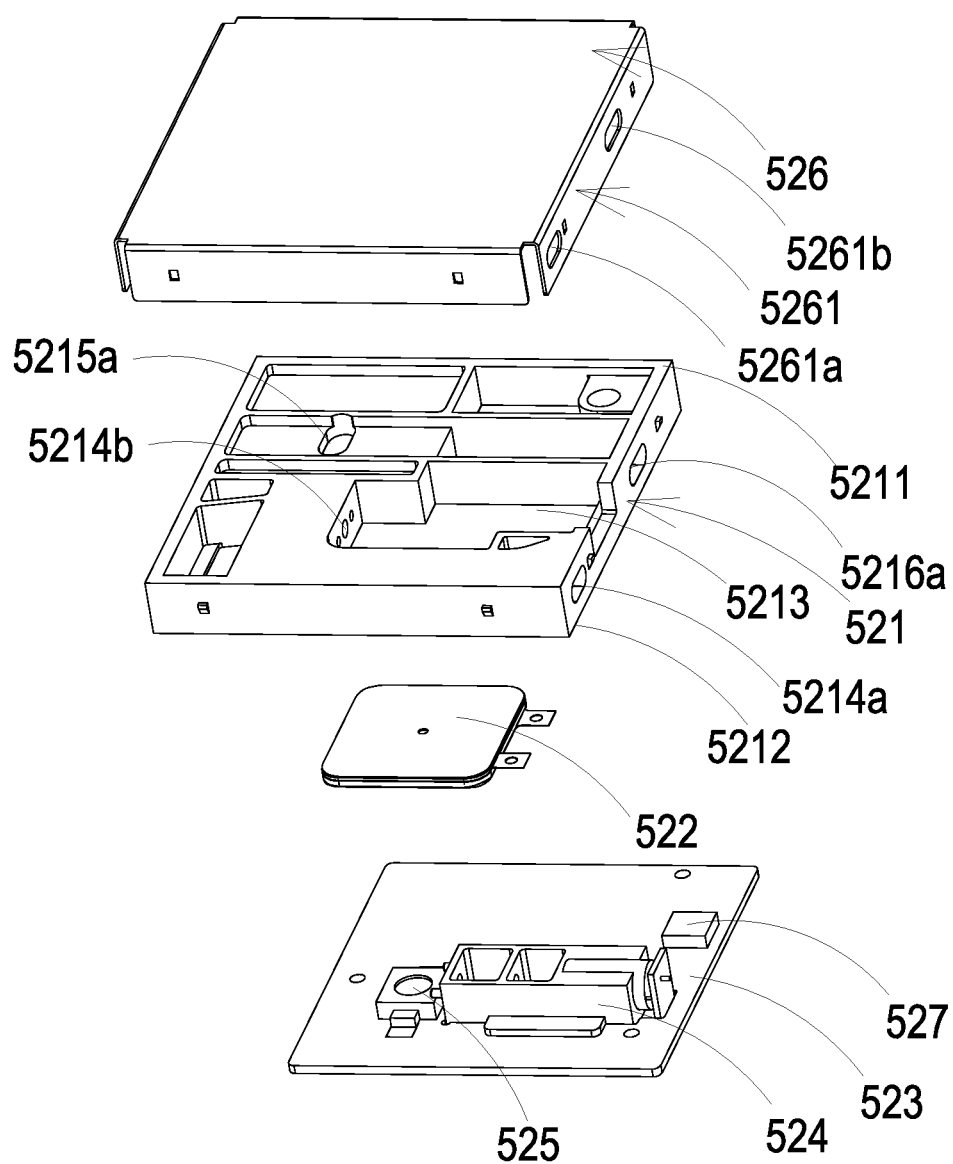
FIG. 6C is an exploded view illustrating the gas detection main part according to the embodiment of the present disclosure.
Figure 7A:
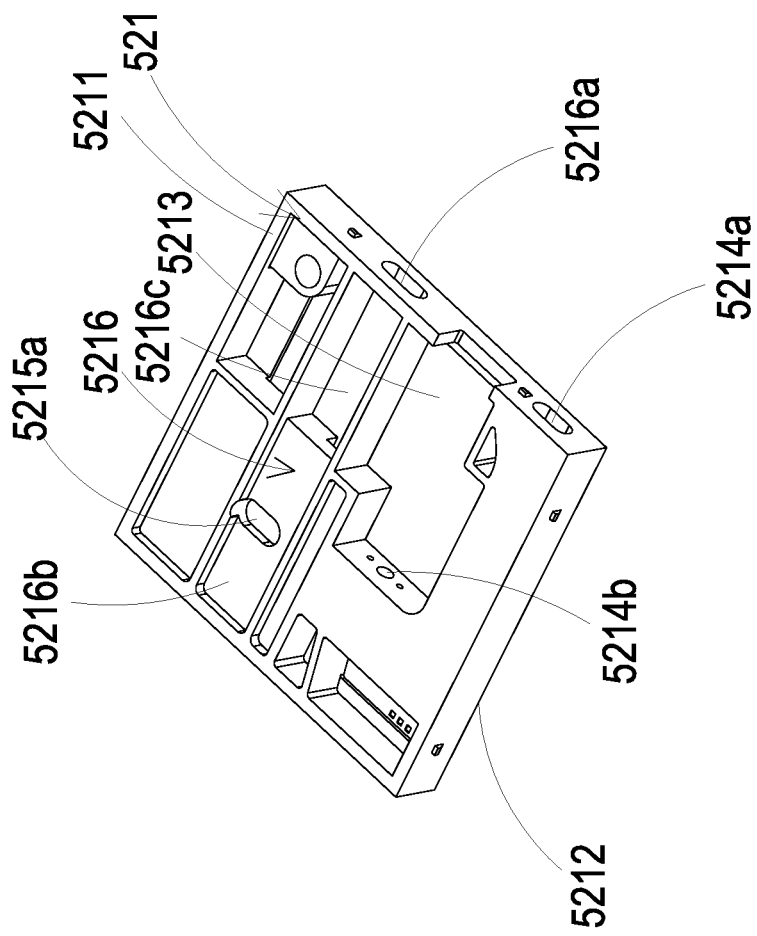
FIG. 7A is a schematic front perspective view illustrating the base according to the embodiment of the present disclosure.
Figure 7B:
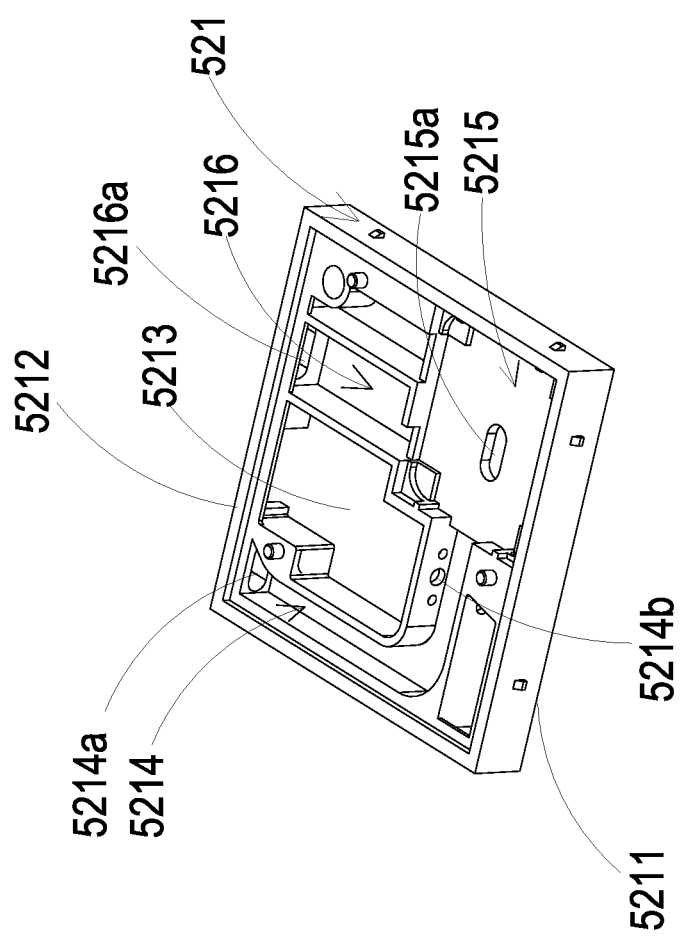
FIG. 7B is a schematic rear perspective view illustrating the base according to the embodiment of the present disclosure.
Figure 8:
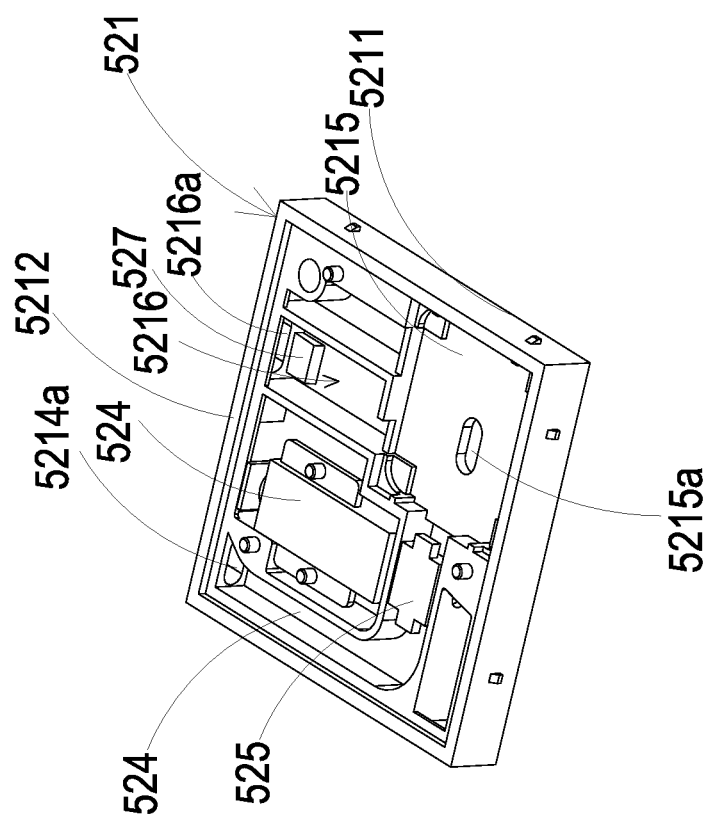
FIG. 8 is a schematic view illustrating a laser component combined within the base according to the embodiment of the present disclosure.
Figure 9A:
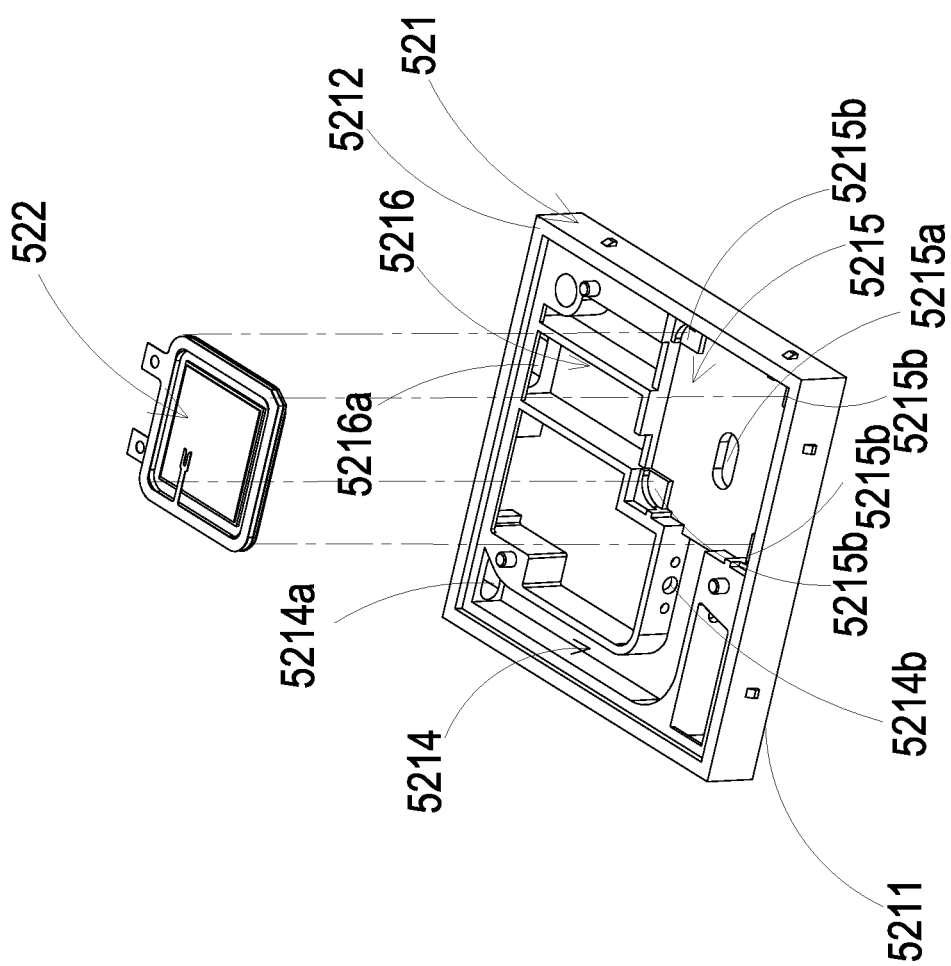
FIG. 9A is a schematic exploded view illustrating the combination of the piezoelectric actuator and the base according to the embodiment of the present disclosure.
Figure 9B:
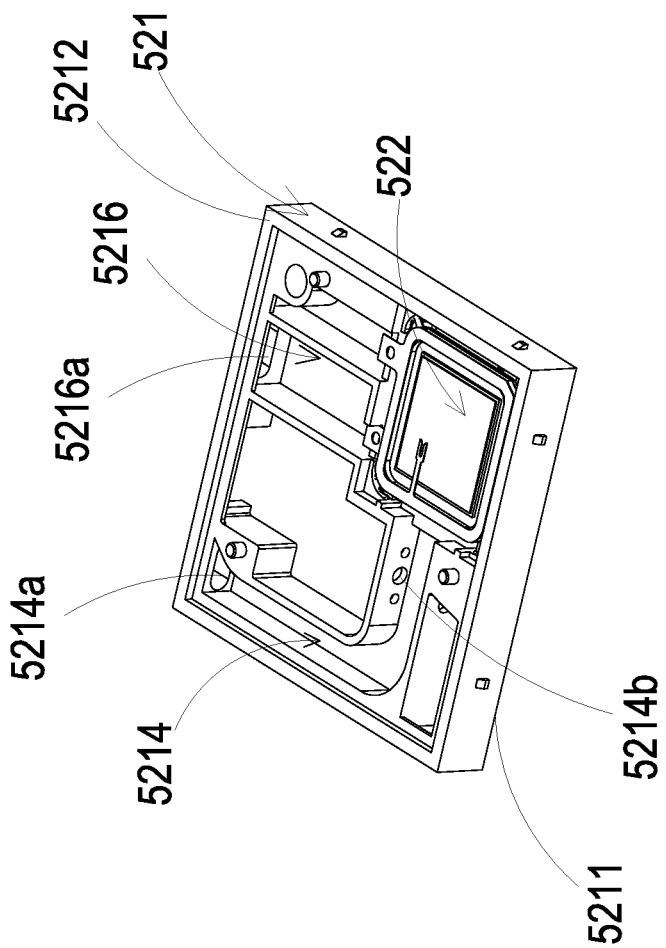
FIG. 9B is a schematic perspective view illustrating the combination of the piezoelectric actuator and the base according to the embodiment of the present disclosure.
Figure 10A:
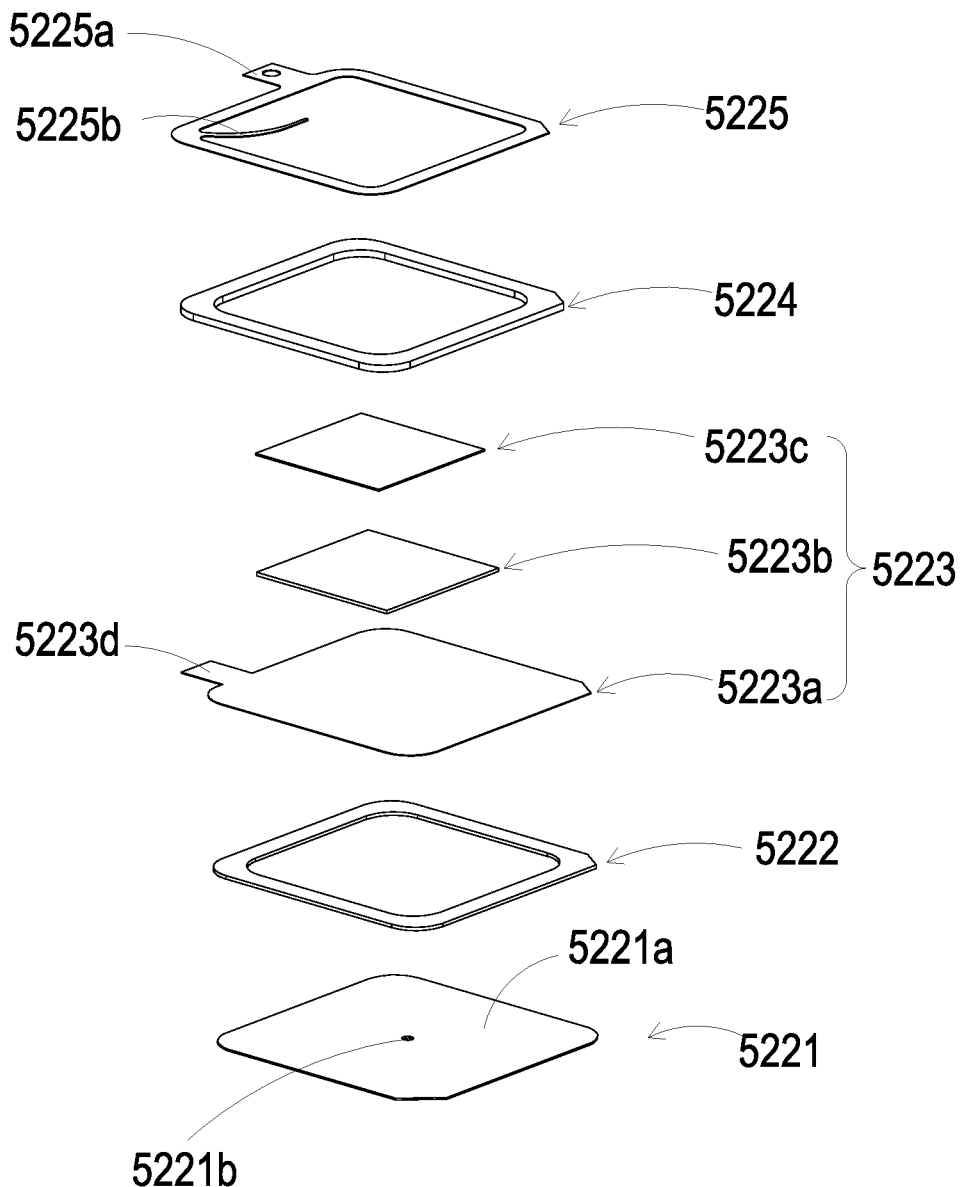
FIG. 10A is a schematic exploded front view illustrating the piezoelectric actuator according to the embodiment of the present disclosure.
Figure 10B:
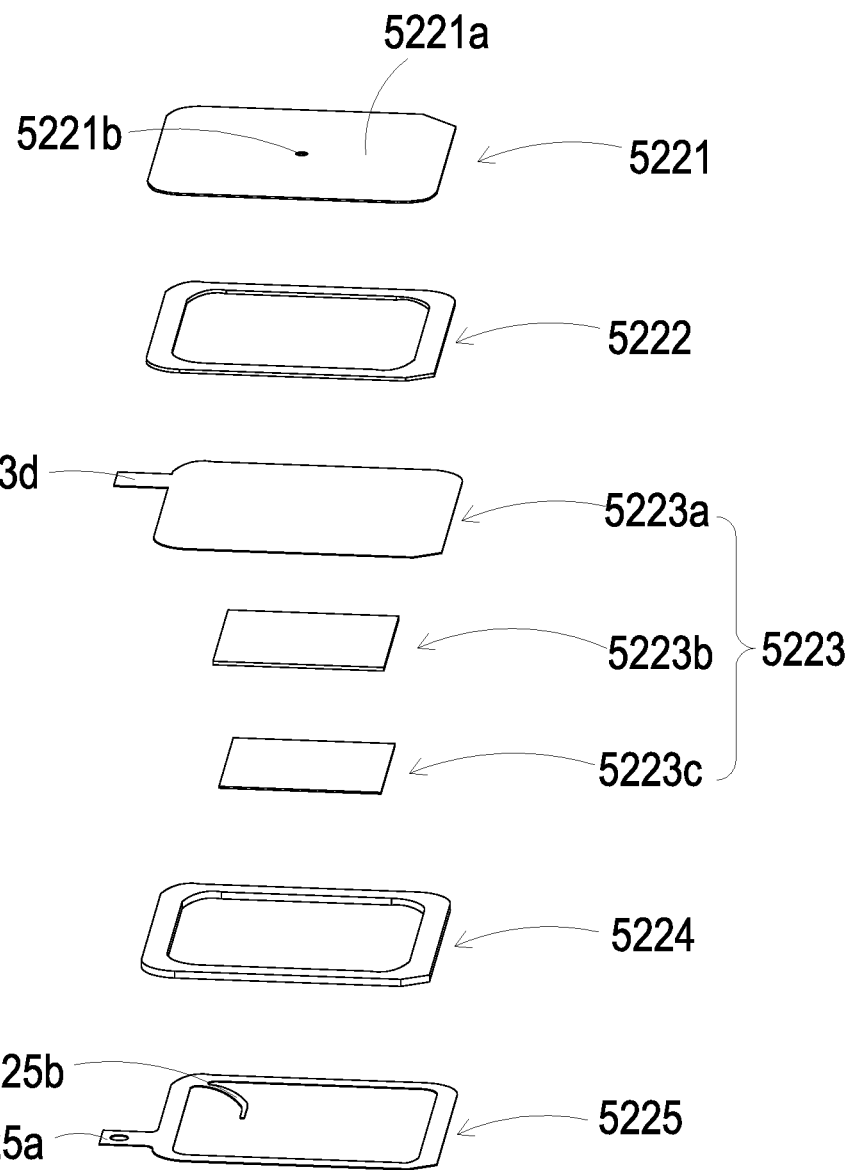
FIG. 10B is a schematic exploded rear view illustrating the piezoelectric actuator according to the embodiment of the present disclosure.
Figure 14:
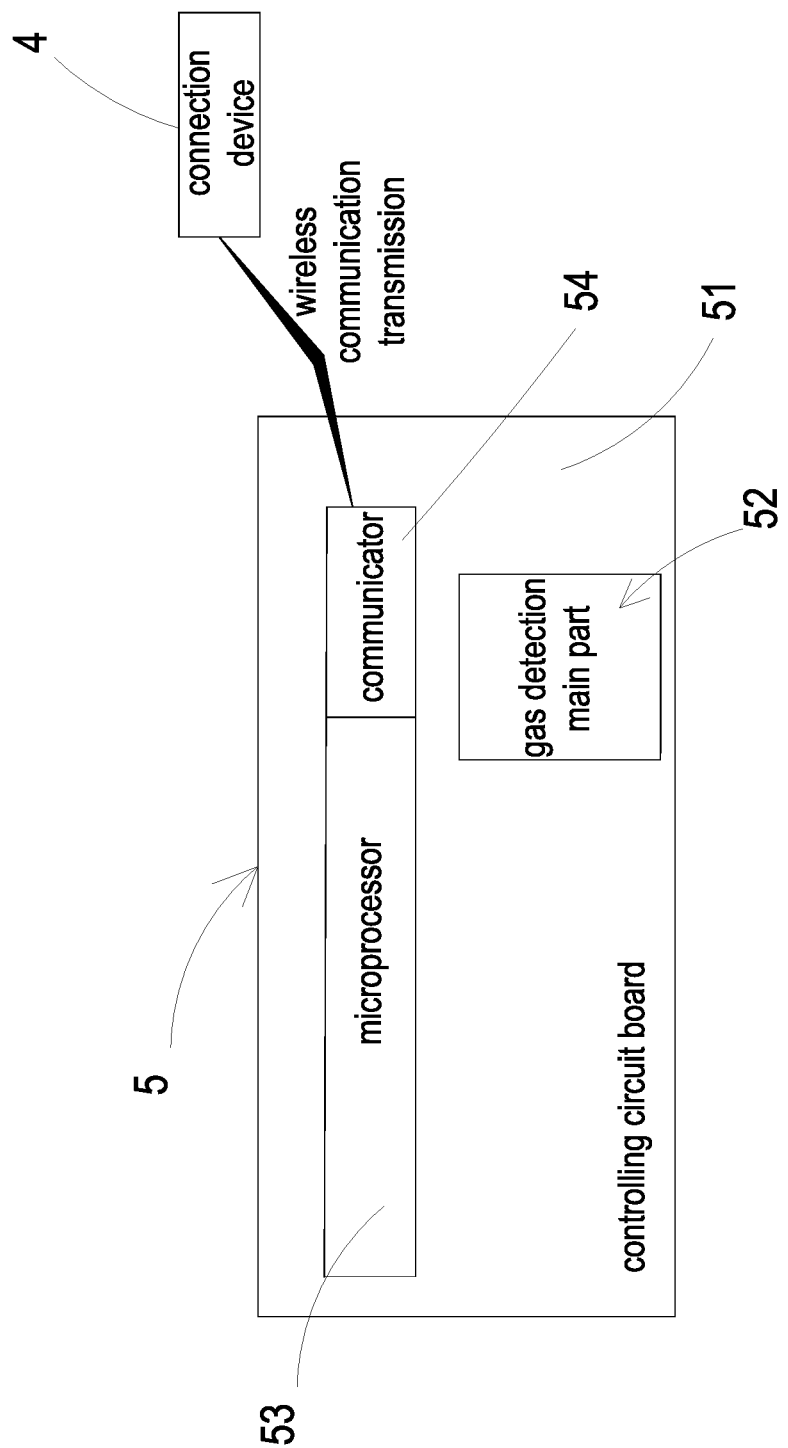
FIG. 14 is a block diagram illustrating a connecting configuration of the gas detection module and the connection device according to the embodiment of the present disclosure.

As shown in FIG. 2C, FIG. 5 and FIG. 14, in the embodiment, the gas detection module 5 includes a controlling circuit board 51, a gas detection main part 52, a microprocessor 53 and a communicator 54. The gas detection main part 52, the microprocessor 53 and the communicator 54 are integrally packaged on the controlling circuit board 51 and electrically connected to each other. In the embodiment, the microprocessor 53 and the communicator 54 are mounted on the controlling circuit board 51. The microprocessor 53 controls the detection of the gas detection main part 52, and the gas detection main part 52 detects the air pollution and outputs a detection signal. The microprocessor 53 receives the detection signal for calculating, processing and outputting, so that the respective microprocessor 53 of the respective gas detection module 5 in the out-car gas detection device 1a, the in-car gas detection device 1b and the purification device 3 generates the out-car gas detection datum, the in-car gas detection datum and the inside-device gas detection datum, respectively, and provides them to the respective communicators 54 for external communication transmission. Preferably but not exclusively, in the embodiment, the communicator 54 is connected to the connection device 4 for signal connection and transmission. In that, the out-car gas detection datum, the in-car gas detection datum and the inside-device gas detection datum transmitted from the respective communicator 54 are received by the connection device 4 and compared under the calculation of artificial intelligence, and then the connection device 4 selectively transmits a control instruction so as to intelligently select and control the operation and operation time of the in-car gas exchange system 2 and the purification device 3. Whereby, the gas outside the vehicle is controlled to be introduced or not introduced into the inner space of the vehicle by the in-car gas exchange system 2, and the air pollution in the inner space of the vehicle is exchanged out of the vehicle. At the same time, the purification device 3 is controlled and enabled to filter the air pollution in the inner space of the vehicle, so that the air pollution in the inner space of the vehicle is exchanged and filtered into a clean, safe and breathable condition. In the embodiment, the respective communicator 54 communicates with the connection device 4 through a wireless communication transmission. Preferably but not exclusively, the wireless communication transmission is one selected from the group consisting of a Wi-Fi communication transmission, Bluetooth communication transmission, a radio frequency identification communication transmission and a near field communication (NFC) transmission.

Please refer to FIGS. 6A to 6C, 7A to 7B, 8 and 9A to 9B. In the embodiment, the gas detection main part 52 includes a base 521, a piezoelectric actuator 522, a driving circuit board 523, a laser component 524, a particulate sensor 525, a gas sensor 527 and an outer cover 526.

In the embodiment, the base 521 includes a first surface 5211, a second surface 5212, a laser loading region 5213, a gas-inlet groove 5214, a gas-guiding-component loading region 5215 and a gas-outlet groove 5216. In the embodiment, the first surface 5211 and the second surface 5212 are two surfaces opposite to each other. In the embodiment, the laser loading region 5213 is hollowed out from the first surface 5211 toward the second surface 5212. The outer cover 526 covers the base 521 and includes a side plate 5261. The side plate 5261 has an inlet opening 5261a and an outlet opening 5261b. The gas-inlet groove 5214 is concavely formed from the second surface 5212 and disposed adjacent to the laser loading region 5213. The gas-inlet groove 5214 includes a gas-inlet 5214a and two lateral walls. The gas-inlet 5214a is in communication with an environment outside the base 521, and is spatially corresponding in position to an inlet opening 5261a of the outer cover 526. Two transparent windows 5214b are opened on the two lateral walls and are in communication with the laser loading region 5213. Therefore, when the first surface 5211 of the base 521 is covered and attached by the outer cover 526 and the second surface 5212 is covered and attached by the driving circuit board 523, an inlet path is defined by the gas-inlet groove 5214.

In the embodiment, the gas-guiding-component loading region 5215 mentioned above is concavely formed from the second surface 5212 and in communication with the gas-inlet groove 5214. A ventilation hole 5215a penetrates a bottom surface of the gas-guiding-component loading region 5215. The gas-guiding-component loading region 5215 includes four positioning protrusions 5215b disposed at four corners of the gas-guiding-component loading region 5215, respectively. In the embodiment, the gas-outlet groove 5216 includes a gas-outlet 5216a, and the gas-outlet 5216a is spatially corresponding to the outlet opening 5261b of the outer cover 526. The gas-outlet groove 5216 includes a first section 5216b and a second section 5216c. The first section 5216b is concavely formed on a region out from the first surface 5211 spatially corresponding to a vertical projection area of the gas-guiding-component loading region 5215. The second section 5216c is hollowed out from the first surface 5211 to the second surface 5212 in a region where the first surface 5211 is extended from the vertical projection area of the gas-guiding-component loading region 5215. The first section 5216b and the second section 5216c are connected to form a stepped structure. Moreover, the first section 5216b of the gas-outlet groove 5216 is in communication with the ventilation hole 5215a of the gas-guiding-component loading region 5215, and the second section 5216c of the gas-outlet groove 5216 is in communication with the gas-outlet 5216a. In that, when first surface 5211 of the base 521 is attached and covered by the outer cover 526, and the second surface 5212 of the base 521 is attached and covered by the driving circuit board 523, the gas-outlet groove 5216 and the driving circuit board 523 collaboratively define an outlet path.

In the embodiment, the laser component 524, the particulate sensor 525 and the gas sensor 527 are disposed on and electrically connected to the driving circuit board 523 and located within the base 521. In order to clearly describe and illustrate the positions of the laser component 524, the particulate sensor 525 and the gas sensor 527 in the base 521, the driving circuit board 523 is intentionally omitted in FIG. 8. The laser component 524 is accommodated in the laser loading region 5213 of the base 521, and the particulate sensor 525 is accommodated in the gas-inlet groove 5214 of the base 521 and is aligned to the laser component 524. In addition, the laser component 524 is spatially corresponding to the transparent window 5214b, therefore a light beam emitted by the laser component 524 passes through the transparent window 5214b and is irradiated into the gas-inlet groove 5214. A light beam path from the laser component 524 passes through the transparent window 5214b and extends in an orthogonal direction perpendicular to the gas-inlet groove 5214. In the embodiment, a projecting light beam emitted from the laser component 524 passes through the transparent window 5214b and enters the gas-inlet groove 5214 to irradiate the suspended particles contained in the gas passing through the gas-inlet groove 5214. When the suspended particles contained in the gas are irradiated and generate scattered light spots, the scattered light spots are received and calculated by the particulate sensor 525 to obtain the gas detection information. In the embodiment, the particulate sensor 525 detects suspended particles ($PM_1$, $PM_{2.5}$, $PM_{10}$) information. In the embodiment, the gas sensor 527 is positioned and disposed on the driving circuit board 523, electrically connected to the driving circuit board 523, and accommodated in the gas-outlet groove 5216, so as to detect the gas introduced into the gas-outlet groove 5216. Preferably but not exclusively, in an embodiment, the gas sensor 527 includes a volatile-organic-compound sensor detecting carbon dioxide ($CO_2$) or volatile organic compounds (TVOC) information. Preferably but not exclusively, in an embodiment, the gas sensor 527 includes a formaldehyde sensor for detecting formaldehyde (HCHO) gas information. Preferably but not exclusively, in an embodiment, the gas sensor 527 includes a bacteria sensor for detecting bacteria or fungi information. Preferably but not exclusively, in an embodiment, the gas sensor 527 includes a virus sensor for detecting virus gas information.

Please refer to FIGS. 10A to 10B and 11A to 11C. In the embodiment, the piezoelectric actuator 522 includes a gas-injection plate 5221, a chamber frame 5222, an actuator element 5223, an insulation frame 5224 and a conductive frame 5225. In the embodiment, the gas-injection plate 5221 is made by a flexible material and includes a suspension plate 5221a and a hollow aperture 5221b. The suspension plate 5221a is a sheet structure and is permitted to undergo a bending deformation. Preferably but not exclusively, the shape and the size of the suspension plate 5221a are accommodated in the inner edge of the gas-guiding-component loading region 5215, but not limited thereto. The hollow aperture 5221b passes through a center of the suspension plate 5221a, so as to allow the gas to flow therethrough. The shape of the suspension plate 5221a is selected from the group consisting of a square, a circle, an ellipse, a triangle and a polygon, but not limited thereto. In the embodiment, the chamber frame 5222 is carried and stacked on the gas-injection plate 5221. In addition, the shape of the chamber frame 5222 is corresponding to the gas-injection plate 5221. The actuator element 5223 is carried and stacked on the chamber frame 5222. A resonance chamber 5226 is collaboratively defined by the actuator element 5223, the chamber frame 5222 and the suspension plate 5221a and is formed between the actuator element 5223, the chamber frame 5222 and the suspension plate 5221a. The insulation frame 5224 is carried and stacked on the actuator element 5223 and the appearance of the insulation frame 5224 is similar to that of the chamber frame 5222. The conductive frame 5225 is carried and stacked on the insulation frame 5224, and the appearance of the conductive frame 5225 is similar to that of the insulation frame 5224. In addition, the conductive frame 5225 includes a conducting pin 5225a and a conducting electrode 5225b. The conducting pin 5225a is extended outwardly from an outer edge of the conductive frame 5225, and the conducting electrode 5225b is extended inwardly from an inner edge of the conductive frame 5225. Moreover, the actuator element 5223 further includes a piezoelectric carrying plate 5223a, an adjusting resonance plate 5223b and a piezoelectric plate 5223c. The piezoelectric carrying plate 5223a is carried and stacked on the chamber frame 5222. The adjusting resonance plate 5223b is carried and stacked on the piezoelectric carrying plate 5223a. The piezoelectric plate 5223c is carried and stacked on the adjusting resonance plate 5223b. The adjusting resonance plate 5223b and the piezoelectric plate 5223c are accommodated in the insulation frame 5224. The conducting electrode 5225b of the conductive frame 5225 is electrically connected to the piezoelectric plate 5223c. In the embodiment, the piezoelectric carrying plate 5223a and the adjusting resonance plate 5223b are made by a conductive material. The piezoelectric carrying plate 5223a includes a piezoelectric pin 5223d. The piezoelectric pin 5223d and the conducting pin 5225a are electrically connected to a driving circuit (not shown) of the driving circuit board 523, so as to receive a driving signal, such as a driving frequency and a driving voltage. Through this structure, a circuit is formed by the piezoelectric pin 5223d, the piezoelectric carrying plate 5223a, the adjusting resonance plate 5223b, the piezoelectric plate 5223c, the conducting electrode 5225b, the conductive frame 5225 and the conducting pin 5225a for transmitting the driving signal. Moreover, the insulation frame 5224 is insulated between the conductive frame 5225 and the actuator element 5223, so as to avoid the occurrence of a short circuit. Thereby, the driving signal is transmitted to the piezoelectric plate 5223c. After receiving the driving signal such as the driving frequency and the driving voltage, the piezoelectric plate 5223c deforms due to the piezoelectric effect, and the piezoelectric carrying plate 5223a and the adjusting resonance plate 5223b are further driven to generate the bending deformation in the reciprocating manner.

Furthermore, in the embodiment, the adjusting resonance plate 5223b is located between the piezoelectric plate 5223c and the piezoelectric carrying plate 5223a and served as a cushion between the piezoelectric plate 5223c and the piezoelectric carrying plate 5223a. Thereby, the vibration frequency of the piezoelectric carrying plate 5223a is adjustable. Basically, the thickness of the adjusting resonance plate 5223b is greater than the thickness of the piezoelectric carrying plate 5223a, and the vibration frequency of the actuator element 5223 can be adjusted by adjusting the thickness of the adjusting resonance plate 5223b.

Please refer to FIGS. 9A, 9B, 10A, 10B and 11A. In the embodiment, the gas-injection plate 5221, the chamber frame 5222, the actuator element 5223, the insulation frame 5224 and the conductive frame 5225 are stacked and positioned in the gas-guiding-component loading region 5215 sequentially, so that the piezoelectric actuator 522 is supported and positioned in the gas-guiding-component loading region 5215, and carried on the four positioning protrusions 5215b of the gas-guiding-component loading region 5215 for supporting and positioning, so that a plurality of vacant spaces 5221c are defined between the suspension plate 5221a of the gas-injection plate 5221 and an inner edge of the gas-guiding-component loading region 5215 for gas flowing therethrough. A resonance chamber 5226 is collaboratively defined by the actuator element 5223, the chamber frame 5222 and the suspension plate 5221a. A flowing chamber 5227 is formed between the gas-injection plate 5221 and the bottom surface of the gas-guiding-component loading region 5215. The flowing chamber 5227 is in communication with the resonance chamber 5226 between the actuator element 5223, the chamber frame 5222 and the suspension plate 5221a through the hollow aperture 5221b of the gas-injection plate 5221. By controlling the vibration frequency of the gas in the resonance chamber 5226 to be close to the vibration frequency of the suspension plate 5221a, the Helmholtz resonance effect is generated between the resonance chamber 5226 and the suspension plate 5221a, so as to improve the efficiency of gas transportation.

Figure 11A:
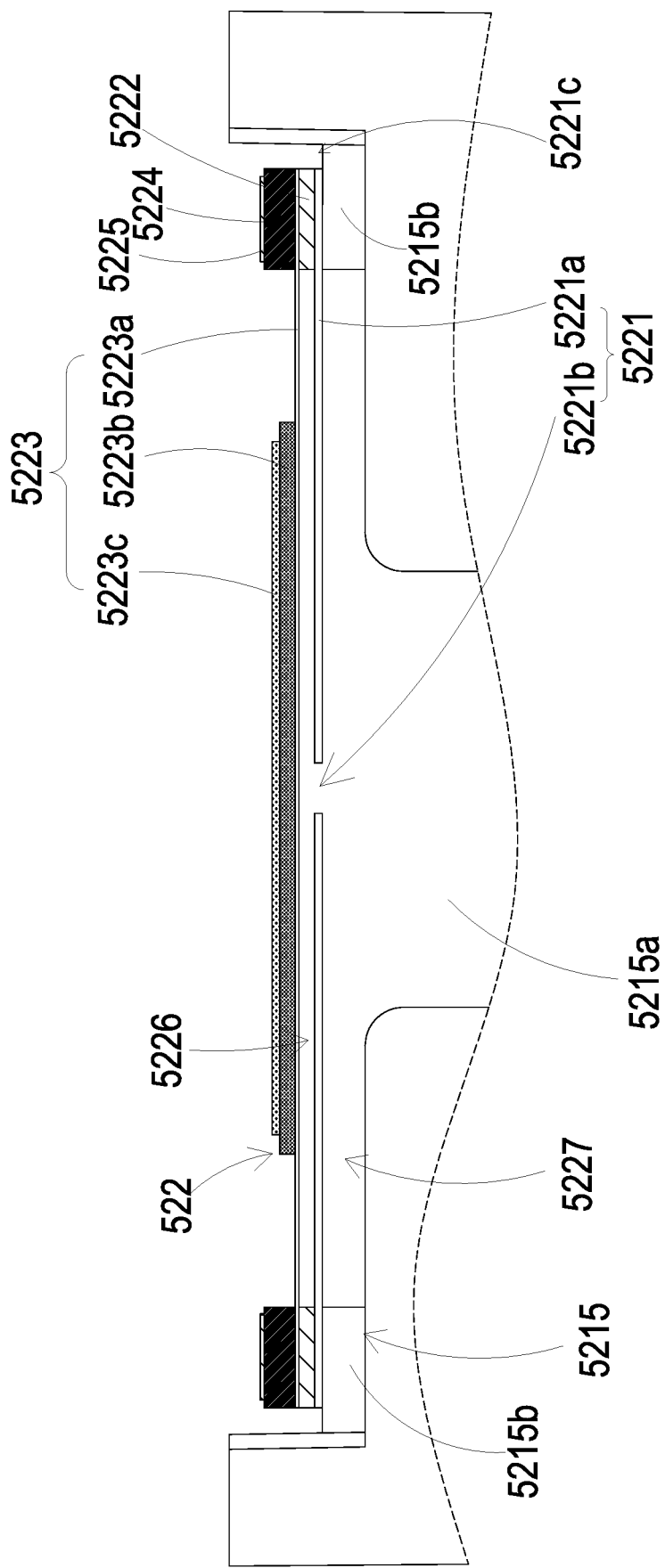
FIGS. 11A to 11C are schematic cross-sectional views illustrating the operation steps of the piezoelectric actuator according to the embodiment of the present disclosure.
Figure 11B:
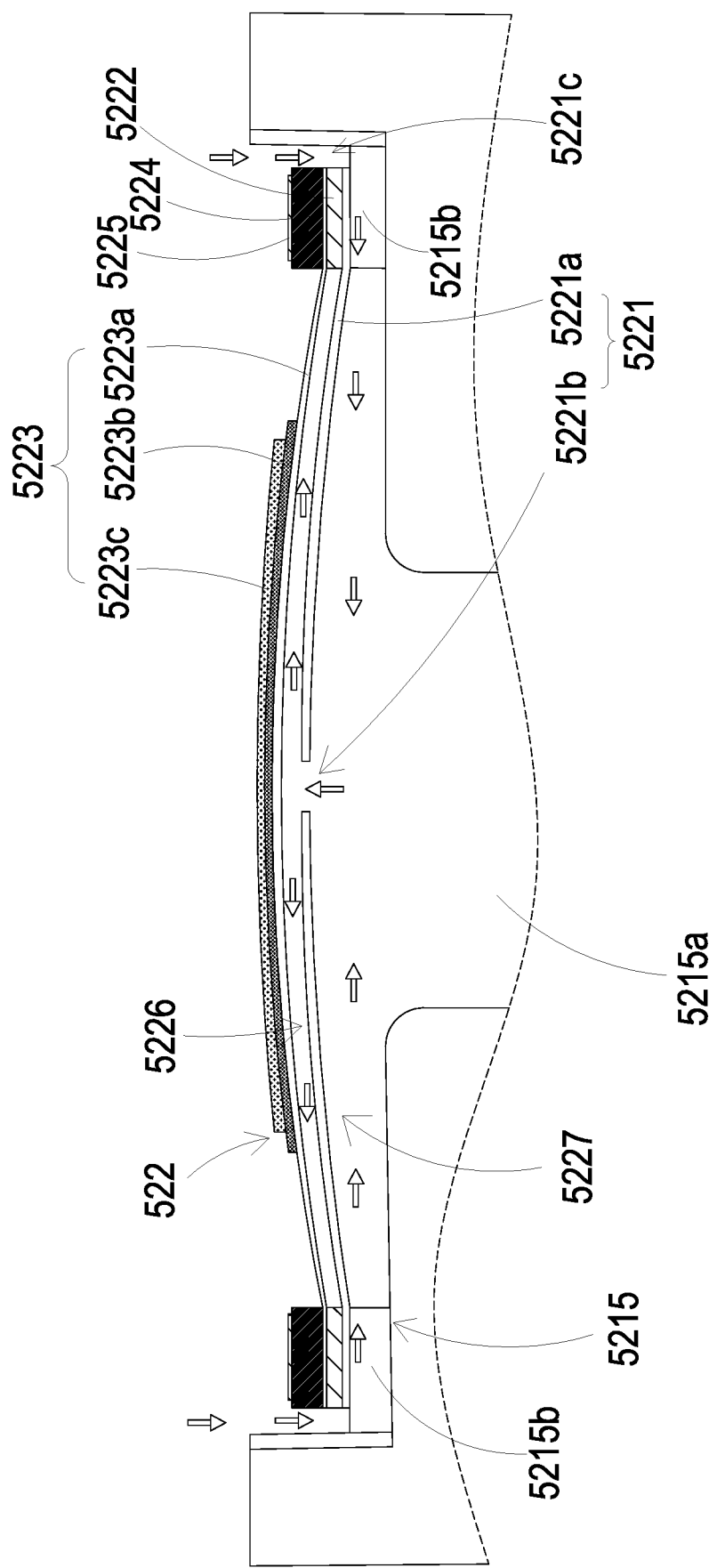

Please refer to FIG. 11B. When the piezoelectric plate 5223c is moved away from the bottom surface of the gas-guiding-component loading region 5215, the suspension plate 5221a of the gas-injection plate 5221 is driven to move away from the bottom surface of the gas-guiding-component loading region 5215 by the piezoelectric plate 5223c. In that, the volume of the flowing chamber 5227 is expanded rapidly, the internal pressure of the flowing chamber 5227 is decreased to form a negative pressure, and the gas outside the piezoelectric actuator 522 is inhaled through the vacant spaces 5221c and enters the resonance chamber 5226 through the hollow aperture 5221b. Consequently, the pressure in the resonance chamber 5226 is increased to generate a pressure gradient.

Figure 11C:
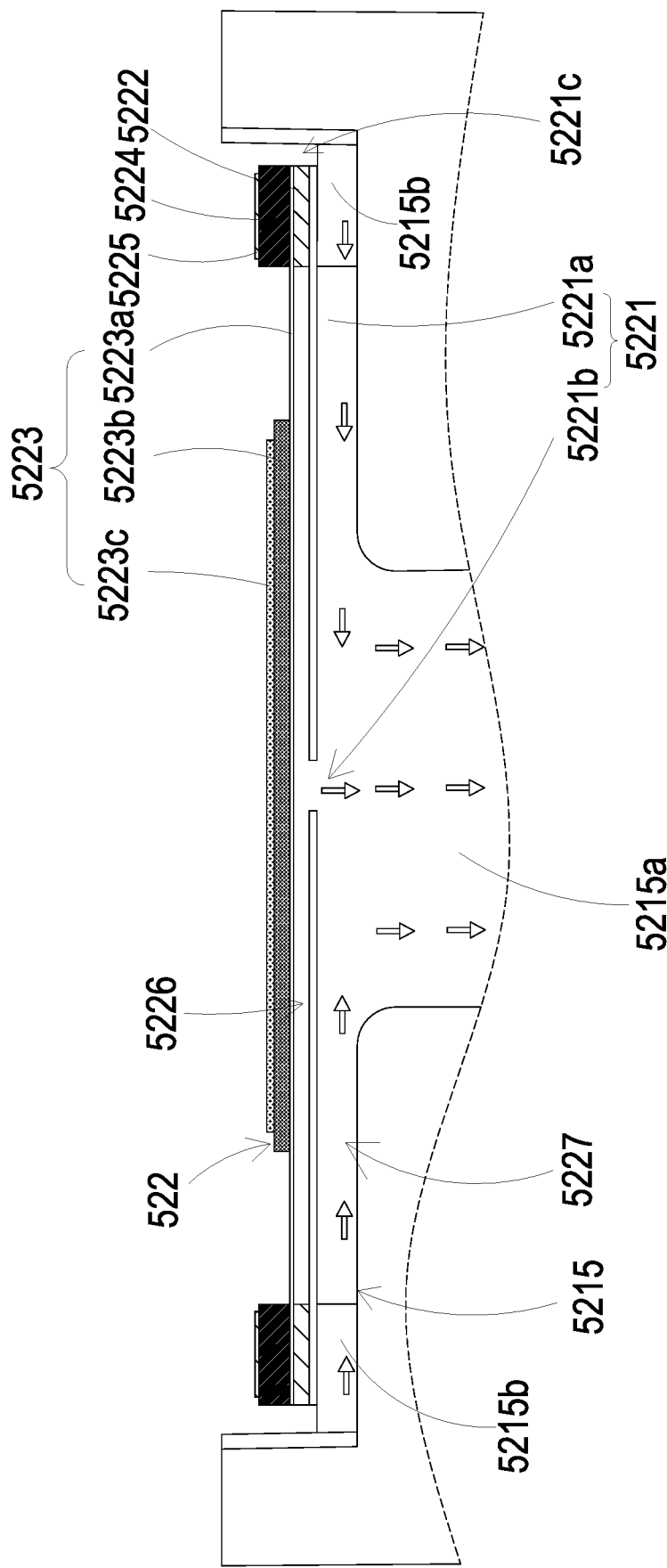

Furthermore as shown in FIG. 11C, when the suspension plate 5221a of the gas-injection plate 5221 is driven by the piezoelectric plate 5223c to move toward the bottom surface of the gas-guiding-component loading region 5215, the gas in the resonance chamber 5226 is discharged out rapidly through the hollow aperture 5221b, and the gas in the flowing chamber 5227 is compressed, thereby the converged gas is quickly and massively ejected out of the flowing chamber 5227 under the condition close to an ideal gas state of the Benulli's law, and transported to the ventilation hole 5215a of the gas-guiding-component loading region 5215.

In the embodiment, the gas-guiding-component loading region 5215 of the base 521 is in fluid communication with the gas-inlet groove 5214, and the piezoelectric actuator 522 is accommodated in the square-shaped gas-guiding-component loading region 5215 of the base 521. Moreover, the driving circuit board 523 covers the second surface 5212 of the base 521, and the laser component 524 is positioned and disposed on the driving circuit board 523, and is electrically connected to the driving circuit board 523. The particulate sensor 525 is positioned and disposed on the driving circuit board 523, and is electrically connected to the driving circuit board 523. In that, when the outer cover 526 covers the base 521, the inlet opening 5261a is spatially corresponding to the gas-inlet 5214a of the base 521, and the outlet opening 5261b is spatially corresponding to the gas-outlet 5216a of the base 521. By repeating the above operation steps shown in FIG. 11B and FIG. 11C, the piezoelectric plate 5223c is driven to generate the bending deformation in a reciprocating manner According to the principle of inertia, since the gas pressure inside the resonance chamber 5226 is lower than the equilibrium gas pressure after the converged gas is ejected out, the gas is introduced into the resonance chamber 5226 again. Moreover, the vibration frequency of the gas in the resonance chamber 5226 is controlled to be close to the vibration frequency of the piezoelectric plate 5223c, so as to generate the Helmholtz resonance effect to achieve the gas transportation at high speed and in large quantities.

Figure 12A:
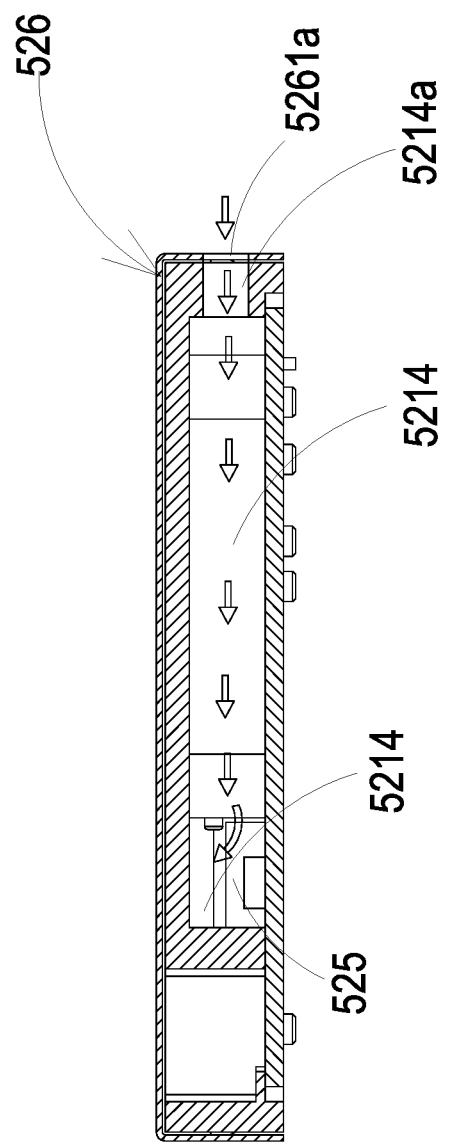
FIG. 12A is a first exemplary schematic cross-sectional view illustrating the gas detection main part according to the embodiment of the present disclosure.
Figure 12B:
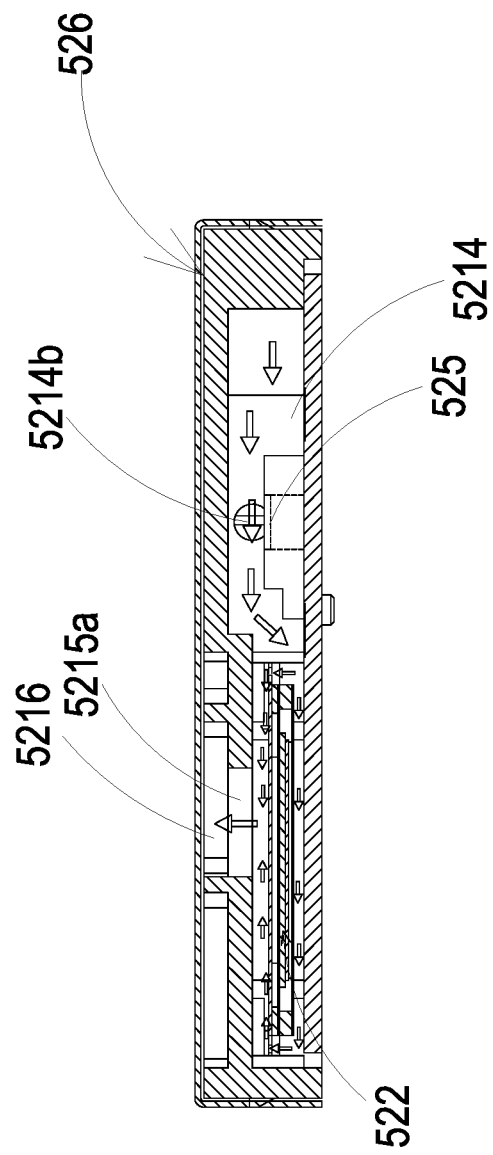
FIG. 12B is a second exemplary schematic cross-sectional view illustrating the gas detection main part according to the embodiment of the present disclosure.
Figure 12C:
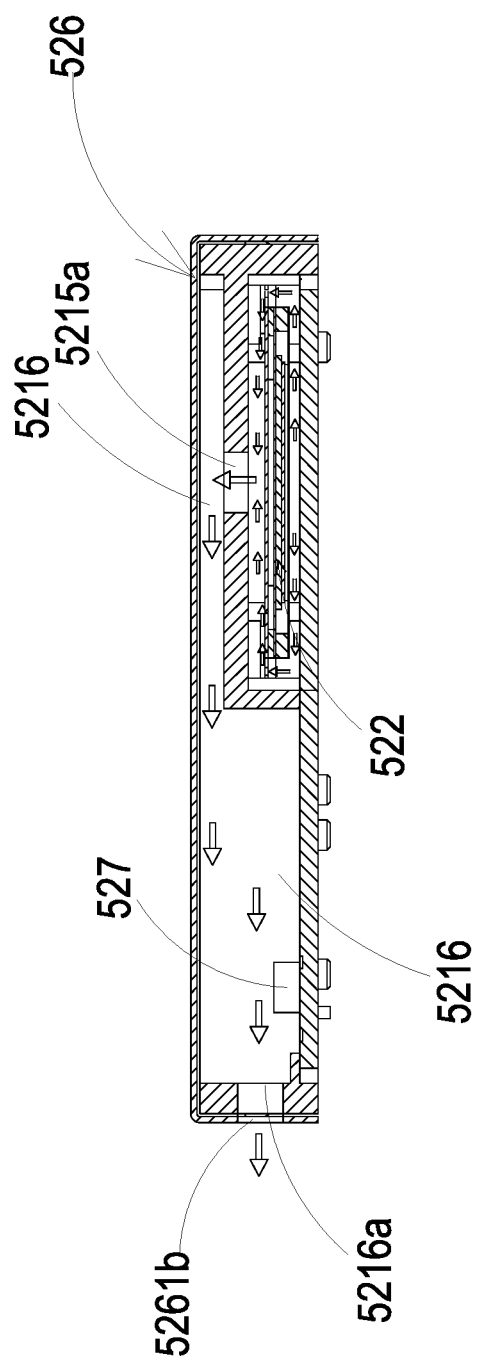
FIG. 12C is a third exemplary schematic cross-sectional view illustrating the gas detection main part according to the embodiment of the present disclosure.

Furthermore, as shown in FIG. 12A, the gas outside the gas detection module 5 is inhaled through the inlet opening 5261a of the outer cover 526, flows into the gas-inlet groove 5214 of the base 521 through the gas-inlet 5214a, and is transported to the position of the particulate sensor 525. The piezoelectric actuator 522 is enabled continuously to inhale the gas into the inlet path, and facilitate the gas outside the gas detection module to be introduced rapidly, flow stably, and transported above the particulate sensor 525. Further as shown in FIG. 12B, a projecting light beam emitted from the laser component 524 passes through the transparent window 5214b to irritate the suspended particles contained in the gas flowing above the particulate sensor 525 in the gas-inlet groove 5214. When the suspended particles contained in the gas are irradiated and generate scattered light spots, the scattered light spots are received and calculated by the particulate sensor 525 for obtaining related information about the sizes and the concentration of the suspended particles contained in the gas. Moreover, the gas above the particulate sensor 525 is continuously driven and transported by the piezoelectric actuator 522, flows into the ventilation hole 5215a of the gas-guiding-component loading region 5215, and is transported to the gas-outlet groove 5216. As shown in FIG. 12C, When the gas flows into the gas outlet groove 5216, the gas is detected through the gas sensor 527. Since the gas is continuously transported into the gas outlet groove 5216 by the piezoelectric actuator 522, the gas in the gas outlet groove 5216 is pushed to flow through the gas-outlet 5216a and the outlet opening 5261b and discharged out.

In the embodiment, the air pollution outside the out-car gas detection device 1a, the in-car gas detection device 1b and the purification device 3 is inhaled by the respective gas detection module 5 in the out-car gas detection device 1a, the in-car gas detection device 1b and the purification device 3. In that, the air pollution is inhaled into the inlet path defined by the gas-inlet groove 5214 through the inlet opening 5261a, and passes through the particulate sensor 525 to detect the particle concentration of the suspended particles contained in the air pollution. Furthermore, the air pollution transported by the piezoelectric actuator 522 flows through the ventilation hole 5215a of the gas-guiding-component loading region 5215, enters the outlet path defined by the gas-outlet groove 5216, passes through the gas sensor 527 for detecting, and then is discharged through the gas-outlet 5216a of the base 521 the outlet opening 5261b. In that, the gas detection module 5 of the present disclosure not only detects the suspended particles in the gas, but also detects the introduced air pollution. Preferably but not exclusively, the introduced air pollution is detected is selected from the group consisting of carbon monoxide (CO), carbon dioxide ($CO_2$), ozone ($O_3$), sulfur dioxide ($SO_2$), nitrogen dioxide ($NO_2$), lead (Pb), total volatile organic compounds (TVOC), formaldehyde (HCHO), bacteria, fungi, virus and a combination thereof.

Figure 4A:
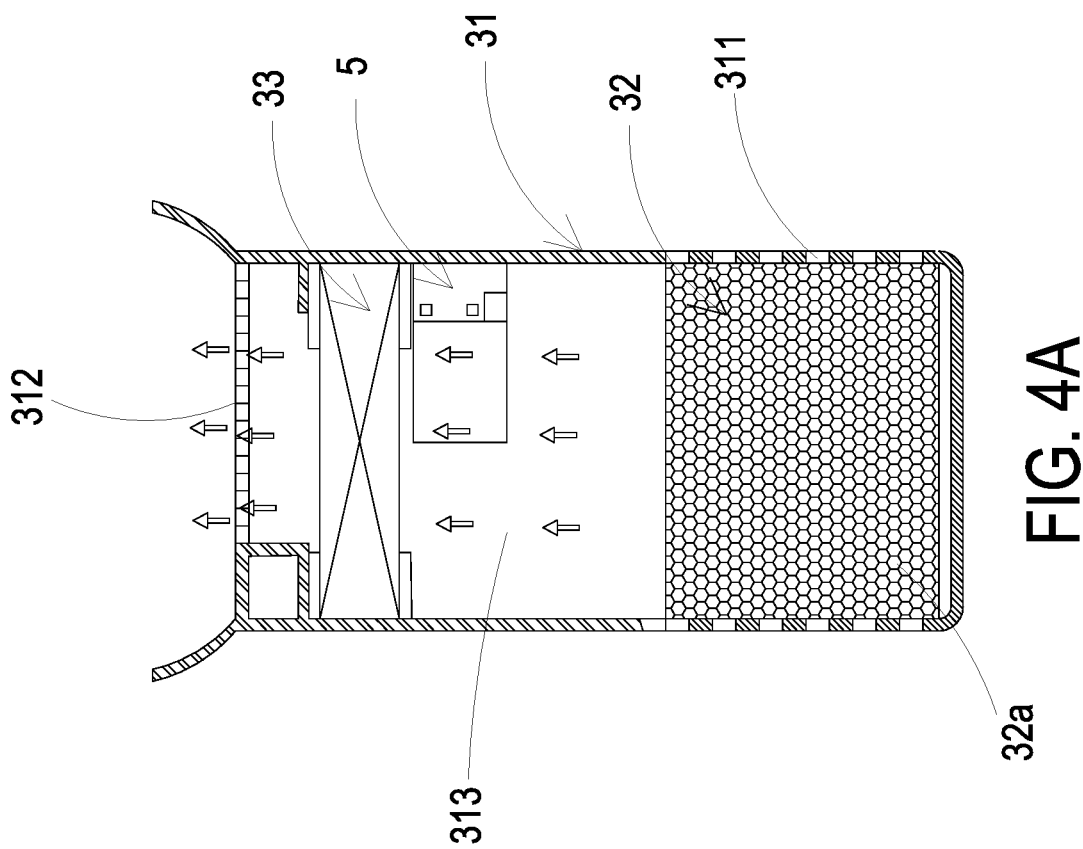
FIG. 4A is a first exemplary schematic diagram illustrating the purification device of the present disclosure.

Please refer to FIGS. 4A to 4E. The above-mentioned purification unit 32 can be executed in the combination of various embodiments. Preferably but not exclusively, in the embodiment as shown in FIG. 4A, the purification unit 32 includes a high efficiency particulate air (HEPA) filter screen 32a. The gas introduced through the gas flow channel 313 is filtered through the HEPA filter screen 32a to adsorb the chemical smoke, bacteria, dust particles and pollen contained therein to achieve the effects of filtering and purifying. In an embodiment, the high efficiency particulate air filter screen 32a is coated with a cleansing factor containing chlorine dioxide to inhibit viruses and bacteria contained in the air pollution introduced through the gas flow channel 313. In an embodiment, the high efficiency particulate air filter screen 32a is coated with an herbal protective layer extracted from ginkgo and Japanese *Rhus chinensis* to form an herbal protective anti-allergic filter, so as to resist allergy effectively and destroy a surface protein of influenza virus contained in the air pollution introduced through the gas flow channel 313. In an embodiment, the high efficiency particulate air filter screen 32a is coated with a silver ion to inhibit viruses and bacteria contained in the air pollution passing through the gas flow channel 313.

Figure 4B:
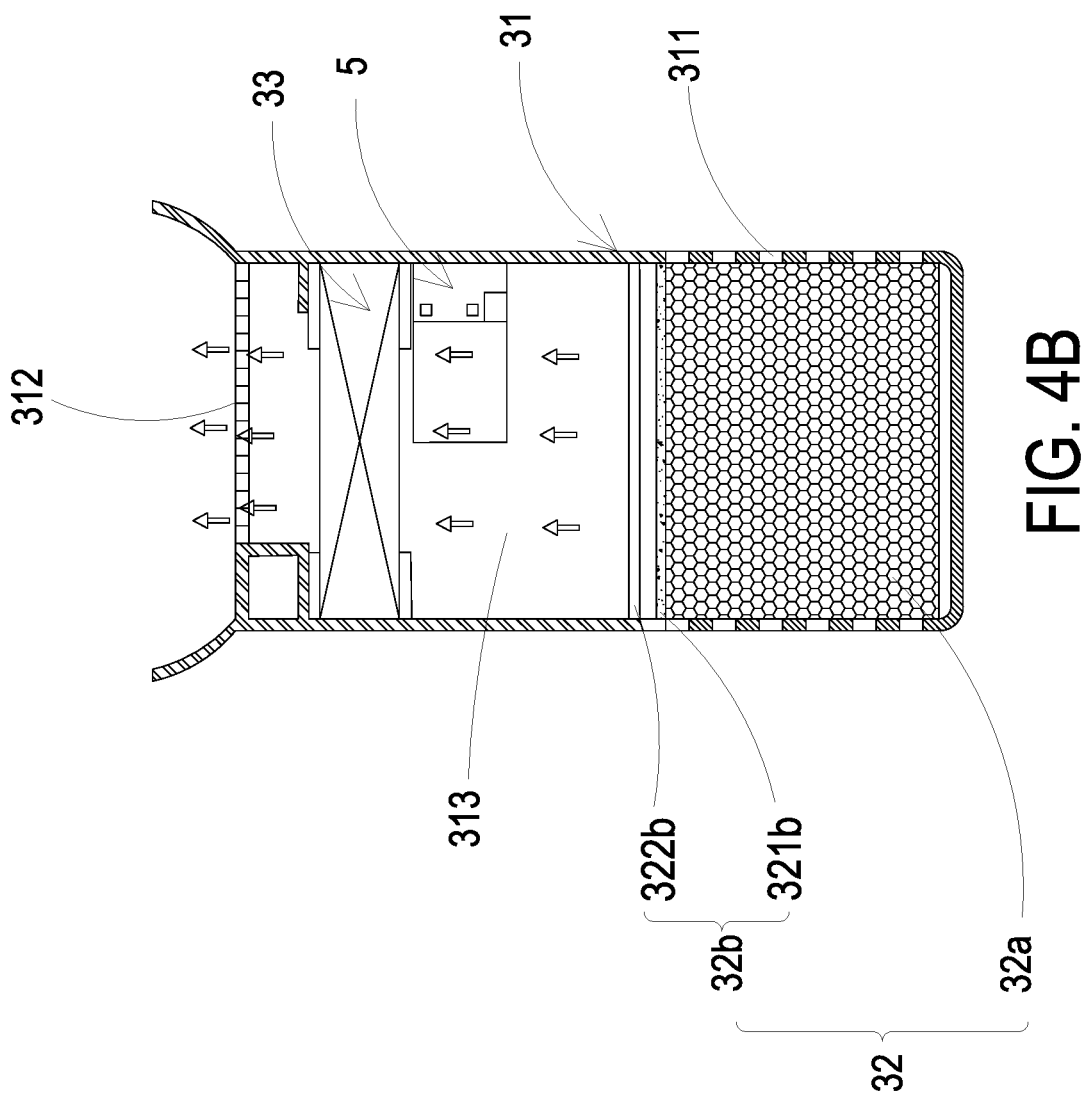
FIG. 4B is a second exemplary schematic diagram illustrating the purification device of the present disclosure.

In the embodiment as shown in FIG. 4B, the purification unit 32 includes a photo-catalyst unit 32b combined with the HEPA filter screen 32a. The photo-catalyst unit 32b includes a photo-catalyst 321b and an ultraviolet lamp 322b. The photo-catalyst 321b is irradiated with the ultraviolet lamp 322b to decompose the air pollution introduced through the gas flow channel 313 for filtering and purification, so as to purify the gas. In the embodiment, the photo-catalyst 321b and the ultraviolet lamp 322b are disposed in the gas flow channel 313, respectively, and spaced apart from each other at a distance. In the embodiment, the air pollution is introduced through the gas flow channel 313 and the photo-catalyst 21b is irradiated by the ultraviolet lamp 22b to convert light energy into chemical energy, thereby decomposing the harmful gases in the air pollution and disinfecting bacteria contained therein, so as to achieve the effects of filtering and purifying.

Figure 4C:
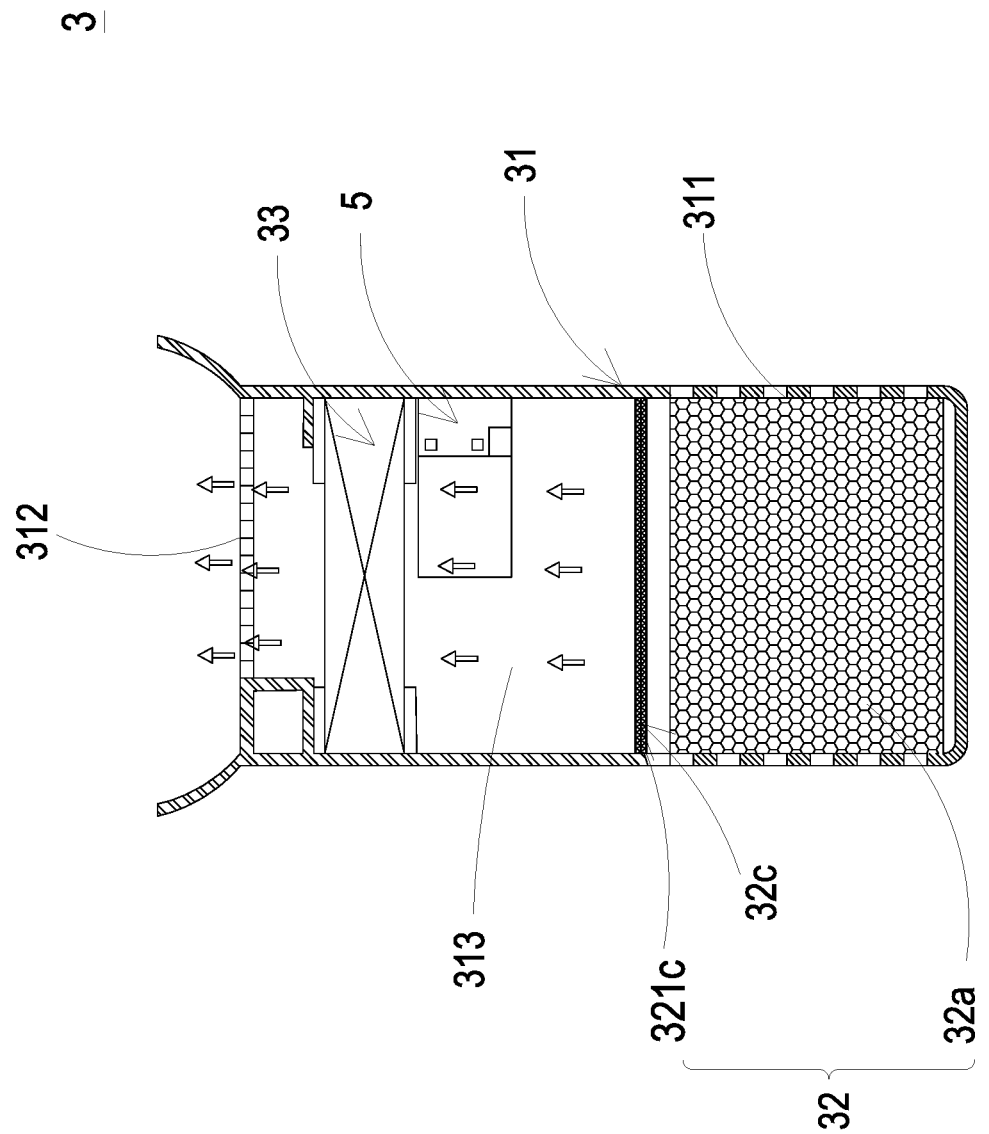
FIG. 4C is a third exemplary schematic diagram illustrating the purification device of the present disclosure.

In the embodiment as shown in FIG. 4C, in the embodiment, the purification unit 32 includes a photo-plasma unit 32c combined with the HEPA filter screen 32a. The photo-plasma unit 32c includes a nanometer irradiation tube 321c. The air pollution introduced through the gas flow channel 313 is irradiated by the nanometer irradiation tube 321c to decompose and purify volatile organic compounds contained therein. In the embodiment, the nanometer irradiation tube 321c is disposed in the gas flow channel 313. The air pollution introduced through the gas flow channel 313 is irradiated by the nanometer irradiation tube 321c, thereby oxygen molecules and water molecules contained in the air pollution are decomposed into high oxidizing photo-plasma, and generates an ion flow capable of destroying organic molecules. In that, volatile formaldehyde, volatile toluene and volatile organic compounds (VOC) contained in the air pollution are decomposed into water and carbon dioxide, so as to achieve the effects of filtering and purifying.

Figure 4D:
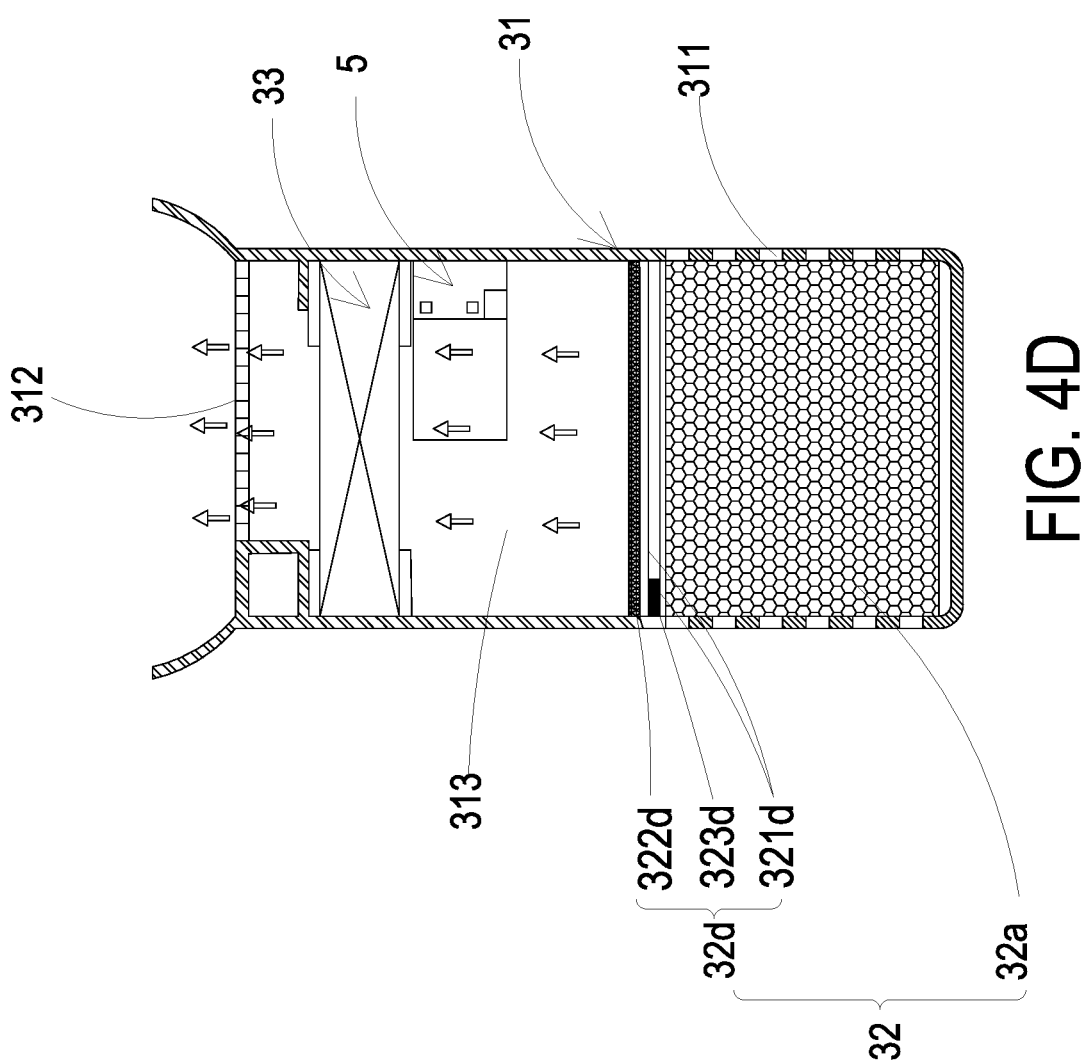
FIG. 4D is a fourth exemplary schematic diagram illustrating the purification device of the present disclosure.

In the embodiment as shown in FIG. 4D, the purification unit 32 includes a negative ionizer 32d combined with the HEPA filter screen 32a. The negative ionizer 32d includes at least one electrode wire 321d, at least one dust collecting plate 322d and a boost power supply device 323d. When a high voltage is discharged through the electrode wire 321d, the suspended particles contained in the air pollution introduced through the gas flow channel 313 are attached to the dust collecting plate 322d, so as to be filtered and purified. In the embodiment, the at least one electrode wire 321d and the at least one dust collecting plate 322d are disposed within the gas flow channel 313. When the at least one electrode wire 321d is provided with a high voltage to discharge by the boost power supply device 323d, the dust collecting plate 322d is carried with negative charge. When the air pollution is introduced through the gas flow channel 313, the at least one electrode wire 321d discharges to make the suspended particles in the air pollution to carry with positive charge, and therefore the suspended particles contained in the air pollution with positive charge are adhered to the dust collecting plate 322d with negative charges, so as to achieve the effects of filtering and purifying the air pollution introduced.

Figure 4E:
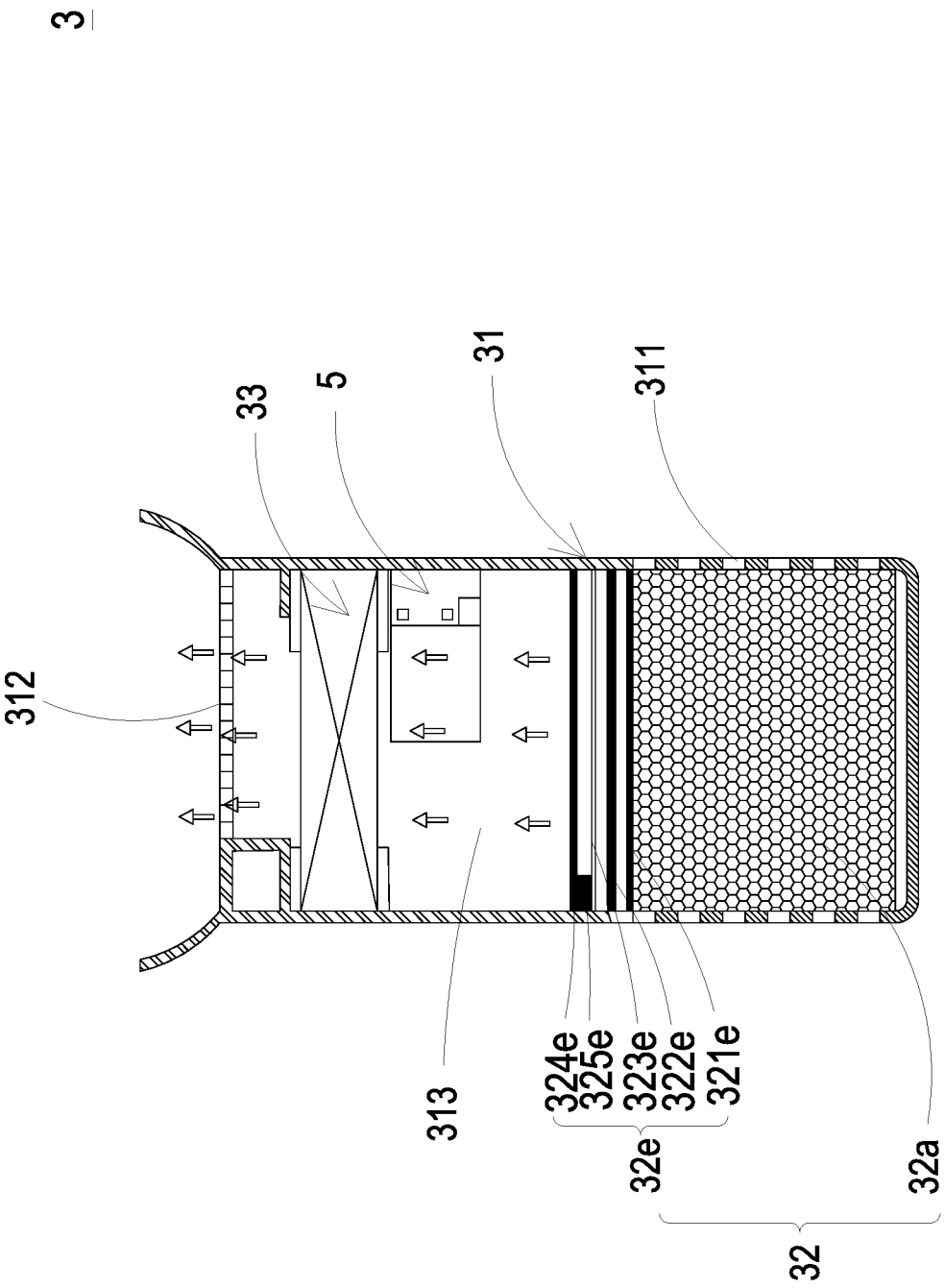
FIG. 4E is a fifth exemplary schematic diagram illustrating the purification device of the present disclosure.

In the embodiment as shown in FIG. 4E, the purification unit 32 includes a plasma ion unit 32e combined with the HEPA filter screen 32a. The plasma ion unit 32e includes a first electric-field protection screen 321e, an adsorption filter screen 322e, a high-voltage discharge electrode 323e, a second electric-field protection screen 324e and a boost power supply device 325e. The boost power supply device 325e provides a high voltage to the high-voltage discharge electrode 323e to discharge and form a high-voltage plasma column with plasma ion, so as to decompose viruses or bacteria contained in the air pollution introduced through the gas flow channel 313 by the plasma ion. In the embodiment, the first electric-field protection screen 321e, the adsorption filter screen 322e, the high-voltage discharge electrode 323e and the second electric-field protection screen 324e are disposed within the gas flow channel 313. The adsorption filter screen 322e and the high-voltage discharge electrode 323e are located between the first electric-field protection screen 321e and the second electric-field protection screen 324e. As the high-voltage discharge electrode 323e is provided with a high voltage by the boost power supply 325e, a high-voltage plasma column with plasma ion is formed. When the air pollution is introduced into the gas flow channel 313, oxygen molecules and water molecules contained in the air pollution are decomposed into positive hydrogen ions ($H^+$) and negative oxygen ions ($O_2^-$) by the plasma ion. The substances attached with water around the ions are adhered on the surface of viruses and bacteria and converted into OH radicals with extremely strong oxidizing power, thereby removing hydrogen (H) from the protein on the surface of viruses and bacteria, and thus decomposing (oxidizing) the protein, so as to filter the introduced air pollution and achieve the effects of filtering and purifying.

In summary, the present disclosure provides a method of preventing air pollution in a vehicle. An out-car gas detection datum, an in-car gas detection datum and an inside-device gas detection datum are detected and outputted by gas detection modules provide in the out-car gas detection device, the in-car gas detection device and the purification device, respectively. An in-car gas exchange system is provided for intelligently selecting and controlling a gas outside the vehicle to be introduced or not introduced into the inner space of the vehicle. A connection device is provided to receive and compare the out-car gas detection datum, the in-car gas detection datum and the inside-device gas detection datum under the calculation of artificial intelligence, thereby the connection device selectively transmits a control instruction to the in-car gas exchange system and the at least one purification device to enable operation and control the operation time thereof, so that the gas outside the vehicle is controlled to be introduced or not introduced into the inner space of the vehicle, and the air pollution in the inner space of the vehicle is exchanged out of the vehicle. At the same time, the purification device is controlled and enabled to filter the air pollution in the inner space of the vehicle, whereby the in-car gas detection datum detected for the air pollution in the inner space of the vehicle is reduced to a safe detection value, and clean, safe and breathable air can be provided. Thus, a real solution for the preventing air pollution in the vehicle is provided. The present disclosure includes the industrial applicability and the inventive steps.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of preventing air pollution in a vehicle for exchanging and filtering air pollution in an inner space of the vehicle and the method comprises:
   a) providing an out-car gas detection device to detect the air pollution outside the vehicle and transmit an out-car gas detection datum;
   b) providing an in-car gas detection device to detect the air pollution inside the vehicle and transmit an in-car gas detection datum;
   c) providing an in-car gas exchange system for selecting and controlling the introduction of a gas outside the vehicle into the inner space of the vehicle;
   d) providing at least one purification device, wherein the at least one purification device comprises a purification unit, a gas guider and a gas detection module, wherein the purification unit is disposed inside the at least one purification device for filtering the air pollution introduced into the at least one purification device, wherein the gas guider disposed inside the at least one purification device for inhaling the air pollution in the inner space of the vehicle to flow through the purification unit for filtering and purifying, wherein the gas detection module is configured to detect filtered air flew through the purification unit and transmit an inside-device gas detection datum for selecting and controlling an activation of filtering the air pollution in the inner space of the vehicle; and
   e) providing a connection device to receive and compare the out-car gas detection datum, the in-car gas detection datum and the inside-device gas detection datum, so that the connection device selectively transmits a control instruction to the in-car gas exchange system and the gas detection module of the at least one purification device for enabling the gas guider, and the air pollution in the inner space of the vehicle is exchanged and filtered, wherein the connection device is a mobile device.

2. The method of preventing air pollution in the vehicle according to claim 1, wherein the air pollution is one selected from the group consisting of suspended particles, carbon monoxide, carbon dioxide, ozone, sulfur dioxide, nitrogen dioxide, lead, total volatile organic compounds (TVOC), formaldehyde, bacteria, fungi, virus and a combination thereof.

3. The method of preventing air pollution in the vehicle according to claim 1, wherein the in-car gas exchange system comprises an air intake channel, an air conditioning unit, an gas exchange channel, a manifold channel and a control drive unit, wherein the air intake channel has an air inlet and at least one air outlet, and an inlet valve is disposed in the air inlet for controlling the opening or closing of the air inlet, wherein the gas exchange channel has a gas exchange inlet and a gas exchange outlet, and an outlet valve is disposed in the gas exchange outlet for controlling the opening or closing of the gas exchange outlet, wherein the manifold channel is in fluid communication between air intake channel and the gas exchange channel, wherein the air pollution in the inner space of the vehicle is reduced to a detection value.

4. The method of preventing air pollution in the vehicle according to claim 3, wherein the air conditioning unit is disposed in the air intake channel, so that the air pollution in the inner space of the vehicle is introduced to the gas exchange channel through the gas exchange inlet with the gas exchange outlet controlled to be closed by the outlet valve, so that the air pollution entering the air intake channel through the manifold channel is introduced into the inner space of the vehicle through the at least one air outlet, whereby a circulating air flow path is formed to adjust air temperature and humidity in the inner space of the vehicle.

5. The method of preventing air pollution in the vehicle according to claim 3, wherein the control drive unit receives the control instruction transmitted from the connection device through a wireless communication transmission, so that the inlet valve and the outlet valve are selectively enabled to control the opening or closing thereof, whereby the gas outside the vehicle is controlled to be introduced or not introduced into the inner space of the vehicle.

6. The method of preventing air pollution in the vehicle according to claim 5, wherein when the connection device indicates that the air pollution of the out-car gas detection datum is lower than the in-car gas detection datum, the control instruction is transmitted by the connection device and received by the control drive unit at the same time, so that the inlet valve and the outlet valve are selected to be opened by the control drive unit, the gas outside the vehicle is inhaled to the air intake channel through the air inlet, and introduced into the inner space of the vehicle through the at least one air outlet, and the air pollution in the inner space of the vehicle is introduced into the gas exchange channel through the gas exchange inlet, and discharged out of the inner space of the vehicle through the gas exchange outlet, wherein the air pollution in the inner space of the vehicle is exchanged out of the vehicle, and the in-car gas detection datum detected for the air pollution in the inner space of the vehicle is reduced to the detection value.

7. The method of preventing air pollution in the vehicle according to claim 3, wherein when the connection device indicates that the air pollution of the in-car gas detection datum is lower than the out-car gas detection datum, the control instruction is transmitted by the connection device and received by the control drive unit at the same time, so that the inlet valve and the outlet valve are selected to be closed and opened by the control drive unit, respectively, the gas outside the vehicle is not introduced into the inner space of the vehicle, and the air pollution in the inner space of the vehicle is introduced to the gas exchange channel through the gas exchange inlet, and discharged out of the inner space of the vehicle through the gas exchange outlet, wherein the air pollution in the inner space of the vehicle is exchanged out of the vehicle, and the in-car gas detection datum detected for the air pollution in the inner space of the vehicle is reduced to the detection value.

8. The method of preventing air pollution in the vehicle according to claim 3, wherein when the connection device indicates that the air pollution of the in-car gas detection datum is lower than the out-car gas detection datum, the control instruction is transmitted by the connection device and received by the control drive unit at the same time, so that the inlet valve and the outlet valve are selected to be closed and opened by the control drive unit, respectively, wherein the control instruction is selected to be transmitted by the connection device to control and actuate the at least one purification device at the same time, so as to filter and purify the air pollution in the inner space of the vehicle, whereby the in-car gas detection datum detected for the air pollution in the inner space of the vehicle is reduced to the detection value.

9. The method of preventing air pollution in the vehicle according to claim 3, wherein when the in-car gas detection datum compared by the connection device is greater than the detection value, the control instruction is transmitted by the connection device to the at least one purification device, and the at least one purification device is controlled and enabled, so as to filter and purify the air pollution in the inner space of the vehicle, whereby the in-car gas detection datum detected for the air pollution in the inner space of the vehicle is reduced to the detection value.

10. The method of preventing air pollution in the vehicle according to claim 3, wherein the detection value comprises one selected from the group consisting of PM2.5 less than 10 $\mu g/m^3$, carbon dioxide content less than 1000 ppm, total volatile organic compounds (TVOC) less than 0.56 ppm, formaldehyde content less than 0.08 ppm, the amount of bacteria less than 1500 $CFU/m^3$, the amount of fungi less than 1000 $CFU/m^3$, sulfur dioxide content less than 0.075 ppm, nitrogen dioxide content less than 0.1 ppm, carbon monoxide content less than 35 ppm, ozone content less than 0.12 ppm, lead content less than 0.15 $\mu g/m^3$ and a combination thereof.

11. The method of preventing air pollution in the vehicle according to claim 1, wherein each of the out-car gas detection device, the in-car gas detection device comprises a gas detection module, wherein the gas detection module comprises a controlling circuit board, a gas detection main part, a microprocessor and a communicator, and the gas detection main part, the microprocessor and the communicator are integrally packaged on the controlling circuit board and electrically connected to the controlling circuit board, wherein the microprocessor controls the operations of detection of the gas detection main part, the gas detection main part detects the air pollution and outputs a detection signal, the microprocessor receives the detection signal for calculating, processing and outputting, so that the microprocessor of the respective gas detection module in the out-car gas detection device, the in-car gas detection device and the at least one purification device generates the out-car gas detection datum, the in-car gas detection datum and the inside-device gas detection datum, so as to provide to the respective communicator for external communication transmission.

12. The method of preventing air pollution in the vehicle according to claim 11, wherein the gas detection main part comprises:
a base comprising:
a first surface;
a second surface opposite to the first surface;
a laser loading region hollowed out from the first surface to the second surface;
a gas-inlet groove concavely formed from the second surface and disposed adjacent to the laser loading region, wherein the gas-inlet groove comprises a gas-inlet and two lateral walls, the gas-inlet is in communication with an environment outside the base, and two transparent windows are opened on the two lateral walls and is in communication with the laser loading region;
a gas-guiding-component loading region concavely formed from the second surface and in communication with the gas-inlet groove, wherein a ventilation hole penetrates a bottom surface of the gas-guiding-component loading region, and
a gas-outlet groove concavely formed from the first surface, spatially corresponding to the bottom surface of the gas-guiding-component loading region, and hollowed out from the first surface to the second surface in a region where the first surface is not aligned with the gas-guiding-component loading region, wherein the gas-outlet groove is in communication with the ventilation hole, and a gas-outlet is disposed in the gas-outlet groove and in communication with the environment outside the base;
a piezoelectric actuator accommodated in the gas-guiding-component loading region;
a driving circuit board covering and attached to the second surface of the base;
a laser component positioned and disposed on the driving circuit board, electrically connected to the driving circuit board, and accommodated in the laser loading region, wherein a light beam path emitted from the laser component passes through the two transparent windows and extends in a direction perpendicular to the gas-inlet groove;
a particulate sensor positioned and disposed on the driving circuit board, electrically connected to the driving circuit board, and disposed at a position where the gas-inlet groove orthogonally intersects with the light beam path of the laser component, so that suspended particles contained in the air pollution passing through the gas-inlet groove and irradiated by a projecting light beam emitted from the laser component are detected;
a gas sensor positioned and disposed on the driving circuit board, electrically connected to the driving circuit board, and accommodated in the gas-outlet groove, so as to detect the air pollution introduced into the gas-outlet groove; and
an outer cover covering the base and comprising a side plate, wherein the side plate has an inlet opening and an outlet opening, the inlet opening is spatially corresponding to the gas-inlet, and the outlet opening is spatially corresponding to the gas-outlet;

wherein the outer cover covers the base, and the driving circuit board covers the second surface, so that an inlet path is defined by the gas-inlet groove, and an outlet path is defined by the gas-outlet groove, thereby the air pollution is inhaled from the environment outside the base by the piezoelectric actuator, transported into the inlet path defined by the gas-inlet groove through the inlet opening, and passes through the particulate sensor to detect the particle concentration of the suspended particles contained in the air pollution, and the air pollution transported through the piezoelectric actuator is transported out of the outlet path defined by the gas-outlet groove through the ventilation hole, passes through the gas sensor for detecting, and then discharged through the outlet opening.

13. The method of preventing air pollution in the vehicle according to claim 12, wherein the particulate sensor detects suspended particulate information, and the gas sensor comprises a volatile-organic-compound sensor detecting carbon dioxide or volatile organic compounds information.

14. The method of preventing air pollution in the vehicle according to claims 12, wherein the gas sensor comprises one selected from the group consisting of a formaldehyde sensor, a bacteria sensor, a virus sensor and a combination thereof, wherein the formaldehyde sensor detects formaldehyde gas information, the bacteria sensor detects bacteria or fungi information, and the virus sensor detects virus gas information.

15. The method of preventing air pollution in the vehicle according to claim 11, wherein the at least one purification device comprises a main body, and the main body comprises at least one inlet and at least one outlet, wherein an gas flow channel is formed between the at least one inlet and the at least one outlet, the purification unit is disposed in the main body for filtering the air pollution introduced into the main body through the at least one inlet, the gas guider is disposed in the gas flow channel and adjacent to the at least one outlet, wherein the air pollution outside the main body is inhaled and flows through the purification unit for filtering and purifying, so that a purified gas is formed by filtering the air pollution and discharged out through the at least one outlet, wherein the gas detection module is disposed in the gas flow channel for detecting the air pollution in the gas flow channel and transmitting the inside-device gas detection datum, and the gas detection module controls the actuation of the gas guider.

16. The method of preventing air pollution in the vehicle according to claim 15, wherein the purification unit comprises a high efficiency particulate air (HEPA) filter screen.

17. The method of preventing air pollution in the vehicle according to claim 16, wherein the HEPA filter screen is coated with a cleansing factor containing chlorine dioxide layer, an herbal protective layer extracted from ginkgo and *Rhus chinensis*, a silver ion or a combination thereof, wherein the cleansing factor containing chlorine dioxide layer inhibits viruses and bacteria contained in the air pollution, the herbal protective layer extracted from ginkgo and *Rhus chinensis* resists allergy effectively and destroys a surface protein of influenza virus passing through the HEPA filter screen, and the silver ion inhibits viruses and bacteria contained in the air pollution.

18. The method of preventing air pollution in the vehicle according to claim 16, wherein the purification unit comprises a high efficiency particulate air (HEPA) filter screen combined with a photo-catalyst unit.

19. The method of preventing air pollution in the vehicle according to claim 11, wherein the respective communicator in the out-car gas detection device, the in-car gas detection device and the at least one purification device communicates with the connection device through a wireless communication transmission, wherein the wireless communication transmission is one selected from the group consisting of a Wi-Fi communication transmission, Bluetooth communication transmission, a radio frequency identification communication transmission and a near field communication (NFC) transmission.

20. The method of preventing air pollution in the vehicle according to claim 1, wherein the out-car gas detection datum, the in-car gas detection datum and the inside-device gas detection datum are received by the mobile device through a wireless communication transmission for calculation and comparison, and the control instruction is transmitted to the in-car gas exchange system and the at least one purification device by the mobile device.

21. The method of preventing air pollution in the vehicle according to claim 1, wherein the connection device is a mobile device, the out-car gas detection datum, the in-car gas detection datum and the inside-device gas detection datum are received by the mobile device through a wireless communication transmission, and transmitted to a cloud processing device for calculation and comparison, wherein the cloud processing device selectively transmits the control instruction to the connection device, and the connection device further transmits the control instruction to the in-car gas exchange system and the at least one purification device.

* * * * *